United States Patent
Filippov et al.

(10) Patent No.: US 11,962,792 B2
(45) Date of Patent: Apr. 16, 2024

(54) METHOD AND APPARATUS OF WEIGHTED PREDICTION FOR NON-RECTANGULAR PARTITIONING MODES

(71) Applicant: Huawei Technologies Co., Ltd., Shenzhen (CN)

(72) Inventors: Alexey Konstantinovich Filippov, Moscow (RU); Vasily Alexeevich Rufitskiy, Moscow (RU); Elena Alexandrovna Alshina, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 211 days.

(21) Appl. No.: 17/701,105

(22) Filed: Mar. 22, 2022

(65) Prior Publication Data
US 2022/0224923 A1    Jul. 14, 2022

Related U.S. Application Data

(63) Continuation of application No. PCT/RU2020/050238, filed on Sep. 23, 2020.
(Continued)

(30) Foreign Application Priority Data

Sep. 23, 2019    (WO) ................ PCT/RU2019/000665

(51) Int. Cl.
    *H04N 19/196*    (2014.01)
    *H04N 19/105*    (2014.01)
    (Continued)

(52) U.S. Cl.
    CPC ......... *H04N 19/196* (2014.11); *H04N 19/105* (2014.11); *H04N 19/137* (2014.11); *H04N 19/176* (2014.11)

(58) Field of Classification Search
    None
    See application file for complete search history.

(56) References Cited

U.S. PATENT DOCUMENTS

| 2005/0281334 A1 | 12/2005 | Walker et al. |
| 2014/0133565 A1 | 5/2014 | Lee et al. |

(Continued)

FOREIGN PATENT DOCUMENTS

| RU | 2687294 C1 | 5/2019 |
| WO | 2013168952 A1 | 11/2013 |

OTHER PUBLICATIONS

Max Blaser et al, "Geometry-based Partitioning for Predictive Video Coding with Transform Adaptation," 2018, IEEE, 5 pages.
(Continued)

*Primary Examiner* — Clifford Hilaire
(74) *Attorney, Agent, or Firm* — Conley Rose, P.C.

(57) ABSTRACT

A method of an inter prediction process performed by a processing unit of a coding system comprises deriving combined linear combination parameters from two sets of linear combination parameters, where a first set of linear combination parameters is independent from the position of the to-be-predicted block and a second set of linear combination parameters depends on the position of the to-be-predicted block; and obtaining the value of the to-be-predicted sample using the combined linear combination parameters and predicted values of at least two samples belonging to different reference blocks of the to-be-predicted block.

20 Claims, 16 Drawing Sheets

Related U.S. Application Data

(60) Provisional application No. 62/911,293, filed on Oct. 6, 2019.

(51) Int. Cl.
*H04N 19/137* (2014.01)
*H04N 19/176* (2014.01)

(56) References Cited

U.S. PATENT DOCUMENTS

2018/0041768 A1 2/2018 Koo et al.
2020/0162728 A1* 5/2020 Van der Auwera .. H04N 19/423

OTHER PUBLICATIONS

JVET-L0124-v2, Ru-Ling Liao et al, "CE10.3.1.b: Triangular prediction unit mode," Joint Video Exploration Team (JVET) of ITU-T SG 16 WP 3 and ISO/IEC JTC 1/SC 29/WG 11, 12th Meeting: Macao, CN, Oct. 3-12, 2018, 8 pages.
JVET-L0646-v5, Yu-Chi Su et al, "CE4-related: Generalized bi-prediction improvements combined from JVET-L0197 and JVET-L0296," Joint Video Experts Team (JVET) of ITU-T SG 16 WP 3 and ISO/IEC JTC 1/SC 29/WG 11, 12th Meeting: Macao, CN, Oct. 3-12, 2018, 6 pages.
JVET-O0244-v1, Vadim Seregin et al, "AHG17: On zero delta POC in reference picture structure," Joint Video Experts Team (JVET) of ITU-T SG 16 WP 3 and ISO/IEC JTC 1/SC 29/WG 11, 15th Meeting: Gothenburg, SE, Jul. 3-12, 2019, 3 pages.
ITU-T H.264, Jun. 2019, "Series H: Audiovisual and Multimedia Systems, Infrastructure of audiovisual services-Coding of moving video, Advanced video coding for generic audiovisual services," 836 pages.
ITU-T H.265, Feb. 2018, "Series H: Audiovisual and Multimedia Systems Infrastructure of audiovisual services-Coding of moving video, High efficiency video coding," 692 pages.
Esenlik, S. et al "Non-CE4: Geometrical partitioning for interblocks," 15 .JVET Meeting; Gothenburg; The Joint Video Exploration Team (JVET) of ITU-T SG 16 WP3 ISO/IEC JTC1/SC29/WG11, JVET-O0489-v4, Jul. 7, 2019, XP030219723, 9 pages.
Chen, Jianle et al: "Algorithm description for Versatile Video Coding and Test Model 6 (VTM 6)", 15th Meeting; Gothenburg, SE, Jul. 3-12, 2019; The Joint Video Experts Team (JVET) ITU-T SG WP3 ISO/IEC JTC1/SC29/WG11, No. JVET-O2002-v2; pp. 1-87, XP030293946.
Zhou, M. et al: "JVET AHG report: Implementation studies(AHG16)", 13th Meeting, Marrakesh, MA, Jan. 9-18, 2019; Joint Video Exploration Team of ITU-T SG 16 WP3 and ISO/IEC JTC1/SC29/WG1, No. JVET-M0016, Jan. 9-18, 2019, XP030252661, 5 pages.
Filippov, A. et al: "Non-CE4: On TPM merge mode in the presence of weighted prediction," 16th Meeting, Geneva, CH, The Joint Video Experts Team of ITU-T SG 16 WP3 and ISO/IEC JTC1/SC29/WG11; No. JVET-P0617-v1; Oct. 1-11, 2019, XP030217867, 9 pages.

* cited by examiner

METHOD AND APPARATUS OF WEIGHTED PREDICTION FOR NON-RECTANGULAR PARTITIONING MODES

CROSS-REFERENCE TO RELATED APPLICATIONS

This application is a continuation of International Patent Application No. PCT/RU2020/050238, filed on Sep. 23, 2020, which claims priority to International Patent Application No. PCT/RU2019/000665, filed on Sep. 23, 2019 and U.S. Provisional Patent App. No. 62/911,293, filed on Oct. 6, 2019. All of the aforementioned patent applications are hereby incorporated by reference in their entireties.

TECHNICAL FIELD

Embodiments of the application (disclosure) generally relate to the field of moving picture processing and more particularly to non-rectangular partitioning modes when they are used in a combination with weighted prediction for coding fades.

BACKGROUND

Video coding (video encoding and decoding) is used in a wide range of digital video applications, for example broadcast digital television (TV), video transmission over internet and mobile networks, real-time conversational applications such as video chat, video conferencing, digital versatile disc (DVD) and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

SUMMARY

Embodiments provide methods for encoding and decoding a video sequence with weighted prediction parameters that are combined from fade weighting parameters and blending weighting parameters. The values of fade weighting parameters are determined by reference index value and reference picture list, while blending weighting parameters are determined by a position of a predicted sample in a predicted block.

In some embodiments, sets of parameter(s) that are independent of the position and sets of parameters that are dependent on the position of a to-be-predicted sample in a to-be-predicted block are used for obtaining the value of the to be predicted sample.

Embodiments provide for an efficient encoding and/or decoding using signal-related information in slice headers only for slices which allow or enable bidirectional inter-prediction, e.g. in bidirectional (B) prediction slices, also called B-slices.

The foregoing and other objects are achieved by the subject matter of the independent claims. Further implementation forms are apparent from the dependent claims, the description and the figures.

Details of one or more embodiments are set forth in the accompanying drawings and the description below. Other features, objects, and advantages will be apparent from the description, drawings, and claims.

According to the disclosure, a method of an inter prediction process is provided, the method performed by a processing unit of a coding system, wherein the method comprises:

Deriving combined linear combination parameters from two sets of linear combination parameters, wherein the two sets of linear combination parameters comprises: a first set of linear combination parameters, the first set comprising at least one parameter, wherein the values of the linear combination parameters of the first set are independent from the position of a to-be-predicted sample within a to-be-predicted block, and a second set of linear combination parameters, the second set comprising at least one parameter, wherein the values of the linear combination parameters of the second set depend on the position of the to-be-predicted sample within the to-be-predicted block;

Obtaining the value of the to-be-predicted sample using the combined linear combination parameters and predicted values of at least two samples belonging to different reference blocks of the to-be-predicted block.

With this method, it is possible to more accurately predict the to-be-predicted sample by taking into account values having a position dependence in the progression from the reference blocks to the to-be-predicted sample and values that do not depend on the position. This increases the efficiency with which the sample can be predicted and thus also increases the encoding and decoding efficiency.

In one embodiment, the first set of linear combination parameters comprises at least one of weight values, offset values and weight bitdepth values.

In a further embodiment, the second set of linear combination parameters comprises at least one of weight value and weight bitdepth value.

It can be provided that the first set of linear combination parameters comprises slice-level weighted prediction parameters. These can be provided in the slice-header, thus only requiring single provision in the header of a slice and reducing the amount of data required for transmitting the information.

The first set of linear combination parameters can further comprise bi-prediction with coding unit (CU)-level weights (BCW) weighting parameters.

In one embodiment, the second set of linear combination parameters comprise triangular partitioning mode (TPM) weighting parameters. With this, the disclosure is applicable to TPM.

In a further embodiment, the second set of linear combination parameters comprise geometric motion partitioning (GEO) weighting parameters. Thereby, prediction using the more general GEO is achieved, allowing for arbitrary combination of reference blocks to the to-be-predicted block, increasing the encoding efficiency.

In one embodiment, the combined linear combination parameter values are stored and fetched from a look-up table (LUT). A look-up table can be accessed efficiently, reducing the processing efforts required for encoding/decoding.

In one embodiment, the different reference blocks comprise different uni-predicted reference blocks. In this context, the term "uni-predicted reference blocks" refers to reference blocks that have been predicted using a single reference picture list. The reference blocks are thus not obtained with methods using more than one reference list to provide the prediction.

It may further be provided that the first set of linear combination parameters is provided in a header of a slice comprising one or more blocks and the second set of linear combination parameters is provided in a look-up table. By this combination, the position independent parameters only need to be provided once for all samples in the slice, reducing the amount of data to be encoded. Using a look-up table for obtaining the position-dependent parameters also reduced the amount of to-be-encoded data as the look-up table only needs to be sent once, thereby increasing the encoding efficiency.

Furthermore, before calculating the predicted sample, the method may comprise grouping together at least one parameter of the first set of linear combination parameters and at least one parameter of the second set of linear combination parameters, thereby obtaining combined linear combination parameters. By this grouping, the number of multiplications for predicting the samples can be reduced.

In an example, for at least one combined linear combination parameter, a right shift can be applied to the value of the combined linear combination parameter. Thereby, the accuracy input in the multiplication is also obtained after the multiplication. Additionally, by this right shift (which is a shift to the right in the bit-representation of the value), the number of bits that need to be encoded is reduced.

In one embodiment, the values of the to-be-predicted sample from the corresponding two samples of the two reference blocks are obtained by: obtaining, from the second set of linear combination parameters, non-normalized values of the parameters; obtaining at least one normalized combined linear combination parameter by applying a right shifting to the value of the combined linear combination parameter; predicting the value of the to-be-predicted sample as a linear combination of the corresponding two samples of the two reference blocks and the normalized combined linear combination parameters by further applying an offset value, wherein the offset value is added either during the linear combination or after the linear combination of the corresponding two samples of the two reference blocks and the normalized combined linear combination parameters.

This order of steps reduced the required mathematical operations for the linear combination to a minimum, thus reducing the processing steps that need to be done by the encoder/decoder and, thereby, increasing the processing efficiency of the encoding/decoding.

According to the disclosure, a coding system for performing a method of an inter prediction process is provided, the coding system comprising a processing unit configured for performing a method of an inter prediction process according to any of the above embodiments.

In one embodiment, the coding system is or comprises a video coding device. Thereby, the disclosure can be applied to video encoding.

In an example, the coding system may be or may comprise a decoder or an encoder. Thereby, encoding or decoding of correspondingly provided datastreams, for example videos, can be achieved with the advantages explained above.

According to the disclosure, an encoder for encoding a video sequence using a method of an inter prediction process is provided, the encoder comprising: a deriving unit; a predicting unit; an encoding unit; Wherein the deriving unit is adapted for deriving combined linear combination parameters from two sets of linear combination parameters, wherein the two sets of linear combination parameters comprises: a first set of linear combination parameters, the first set comprising at least one parameter, wherein the values of the linear combination parameters of the first set are independent from the position of a to-be-predicted sample within a to-be-predicted block, and a second set of linear combination parameters, the second set comprising at least one parameter, wherein the values of the linear combination parameters of the second set depend on the position of the to-be-predicted sample within the to-be-predicted block; and wherein the predicting unit is adapted for obtaining the value of the to-be-predicted sample using the combined linear combination parameters and predicted values of at least two samples belonging to different reference blocks of the to-be-predicted block; and wherein the encoding unit is adapted for encoding the video sequence using the different reference blocks and the first set of linear combination parameters and the second set of linear combination parameters and the predicted values of the at least two samples.

Thereby, efficient encoding of the data input to the encoder is achieved, reducing the size of the encoded video sequence.

In one embodiment, the first set of linear combination parameters comprise at least one of weight values, offset values and weight bitdepth values.

In a further embodiment, the second set of linear combination parameters comprise at least one of weight value and weight bitdepth value.

It may also be provided that the first set of linear combination parameters comprise slice-level weighted prediction parameters. These can be provided in the encoded datastream on a slice-level-basis, i.e. only once for example in the header of a slice comprising a plurality of blocks. Thereby, the amount of data that encodes the first set can be reduced, reducing the size of the encoded video sequence.

In one embodiment, the first set of linear combination parameters comprise BCW weighting parameters.

In a further embodiment, the second set of linear combination parameters comprise TPM weighting parameters. Thereby, encoding using triangular partitioning is efficiently realized.

Alternatively, the second set of linear combination parameters comprises GEO weighting parameters. This allows for the encoding using GEO.

The encoder can be adapted to store combined linear combination parameter values and to fetch the combined linear combination parameters from a look-up table, LUT. Look-up tables are easily accessed in view of the computational steps required for obtaining the data. This makes the obtaining from the combined linear combination parameter values more efficient.

In one embodiment, the different reference blocks comprise different uni-predicted reference blocks.

It can also be provided that the encoder is adapted to provide the first set of linear combination parameters in a header of a slice comprising one or more blocks and to provide the second set of linear combination parameters in a look-up table. This results in more efficient encoding as the position-independent parameters are provided for all samples of a slice in the header and the position-dependent information is provided in a compact datastructure in the form of the LUT.

In one embodiment, the predicting unit is adapted to group, before calculating the predicted sample, together at least one parameter of the first set of linear combination parameters and at least one parameter of the second set of linear combination parameters, thereby obtaining combined linear combination parameters. Thereby, efficient calculation of the predicted sample is achieved as the number of multiplications is reduced through the grouping.

In one embodiment, the predicting unit is adapted to apply, for at least one combined linear combination parameter, a right shift to the value of the combined linear combination parameter. This right shift comprises shifting all bits representing the value to the right, resulting in the precision of the input values being also provided for the combined linear combination parameter and reducing the size of the data in the encoded video sequence.

In a further embodiment, the predicting unit is adapted to obtain the values of the to-be-predicted sample from the corresponding two samples of the two reference blocks by: obtaining, from the second set of linear combination parameters, non-normalized values of the parameters; obtaining at least one normalized combined linear combination parameter by applying a right shifting to the value of the combined linear combination parameter; predicting the value of the to-be-predicted sample as a linear combination of the corresponding two samples of the two reference blocks and the normalized combined linear combination parameters by further applying an offset value, wherein the predicting unit is further adapted to add the offset value either during the linear combination or after the linear combination of the corresponding two samples of the two reference blocks and the normalized combined linear combination parameters. The resulting encoded video sequence is reduced in size, making data transfer more efficient.

According to the disclosure, a decoder for decoding an encoded video sequence using a method of an inter prediction process is provided, the decoder comprising: a receiving unit; a decoding unit; wherein the receiving unit is adapted to receive the encoded video sequence, the encoded video sequence comprising at least two different reference blocks, two samples belonging the different reference blocks, a first set of linear combination parameters, the first set comprising at least one parameter, wherein the values of the linear combination parameters of the first set are independent from the position of a to-be-predicted sample within a to-be-predicted block, and a second set of linear combination parameters, the second set comprising at least one parameter, wherein the values of the linear combination parameters of the second set depend on the position of the to-be-predicted sample within the to-be-predicted block; and wherein the decoding unit is adapted to decode the video sequence, comprising obtaining a value of the to-be-predicted sample using combined linear combination parameters obtained from the first set of linear combination parameters and the second set of linear combination parameters and predicted values of the at least two samples belonging to the different reference blocks of the to-be-predicted block. Thereby, efficient decoding of an encoded datastream making use of inter prediction based on more than one reference sample is obtained.

In one embodiment, the first set of linear combination parameters comprise at least one of weight values, offset values and weight bitdepth values.

In a further embodiment, the second set of linear combination parameters comprise at least one of weight value and weight bitdepth value.

It can also be provided that the first set of linear combination parameters comprise slice-level weighted prediction parameters. Thereby, the first set can be provided only once in a header of the slice and the decoder only needs to obtain the respective information once for decoding all samples in the slice. With this, the efficiency of decoding is increased while the size of the encoded data can be reduced.

In a further embodiment, the first set of linear combination parameters comprise BCW weighting parameters.

In one embodiment, the second set of linear combination parameters comprise triangular partitioning mode, TPM, weighting parameters. Thereby, the decoder can apply TPM prediction for obtaining, from two reference samples, the to-be-predicted sample by a triangular partitioning of the to-be-predicted sample.

In one embodiment, the second set of linear combination parameters comprise GEO weighting parameters. This allows the decoder to apply GEO in predicting the to-be-predicted sample.

In one embodiment, the decoder is adapted to store combined linear combination parameter values and to fetch the combined linear combination parameters from a look-up table, LUT. These can be easily accessed by the decoder, increasing the processing efficiency of the decoding process.

In one embodiment, the different reference blocks comprise different uni-predicted reference blocks.

It can also be provided that the receiving unit is adapted to receive the first set of linear combination parameters in a header of a slice comprising one or more blocks and to receive the second set of linear combination parameters in a look-up table. Thereby, position-independent parameters can be provided once for all samples in a slice. Further, the position-dependent parameters are provided in a way that is accessible in an efficient manner by the decoder with respect to the computing resources required. Thereby, the encoded datastream having reduced size can still be efficiently decoded.

In one embodiment, the decoding unit is adapted to group, before calculating the predicted sample, together at least one parameter of the first set of linear combination parameters and at least one parameter of the second set of linear combination parameters, thereby obtaining combined linear combination parameters. This reduces the number of multiplications that need to be done by the decoding unit, making decoding the encoded video sequence more efficient.

It can also be provided that the decoding unit is adapted to apply, for at least one combined linear combination parameter, a right shift to the value of the combined linear combination parameter. This reduces the bit size of the data, resulting in less processing and making the decoding more efficient.

In one embodiment, the decoding unit is adapted to obtain the values of the to-be-predicted sample from the corresponding two samples of the two reference blocks by: obtaining, from the second set of linear combination parameters, non-normalized values of the parameters; obtaining at least one normalized combined linear combination parameter by applying a right shifting to the value of the combined linear combination parameter; predicting the value of the to-be-predicted sample as a linear combination of the corresponding two samples of the two reference blocks and the normalized combined linear combination parameters by further applying an offset value, wherein the decoding unit is further adapted to add the offset value either during the linear combination or after the linear combination of the corresponding two samples of the two reference blocks and the normalized combined linear combination parameters.

According to the disclosure, a computer-readable storage medium comprising computer-readable instructions stored thereon is provided that, when executed by a processing unit, cause the processing unit to perform a method according to any of the above embodiments.

According to one embodiment of the disclosure, an encoder comprising processing circuitry for carrying out the method according to any of the above embodiments is provided.

According to one embodiment the disclosure, a decoder comprising processing circuitry for carrying out the method according to any of the above embodiments.

According to a further embodiment of the disclosure, a computer program product comprising a program code for performing the method according to any of the above embodiments.

According to one embodiment of the disclosure, a decoder is provided, wherein the decoder comprises: one or more processors; and a non-transitory computer-readable storage medium coupled to the processors and storing programming for execution by the processors, wherein the programming, when executed by the processors, configures the decoder to carry out the method according to any of the above embodiments.

According to a further embodiment of the disclosure, an encoder is provided, wherein the encoder comprises: one or more processors; and a non-transitory computer-readable storage medium coupled to the processors and storing programming for execution by the processors, wherein the programming, when executed by the processors, configures the encoder to carry out the method according to any of the above embodiments.

In one embodiment, a method of an inter prediction process is provided, wherein the method comprises deriving combined linear combination parameters from two sets of linear combination parameters, wherein the two sets of linear combination parameters comprises: a first set of linear combination parameters of which the values are independent from the position of a to-be-predicted sample within a to-be-predicted block, and a second set of linear combination parameters of which the values depend on the position of the to-be-predicted sample within the to-be-predicted block; obtaining the value of the to-be-predicted sample using the combined linear combination parameters and predicted values of at least two samples belonging to different reference blocks of the to-be-predicted block. This method allows for improved encoding and decoding using separated parameter sets that are, on one side, dependent on the position and, on the other side, independent from the position in a combined structure. This reduces the resources required for obtaining the to-be-predicted sample.

In one embodiment, the first set of linear combination parameter comprise at least one of weight values, offset values and weight bitdepth values.

In a further embodiment, the second set of linear combination parameter comprise at least one of weight value and weight bitdepth value.

In one embodiment, the first set of linear combination parameters comprise slice-level weighted prediction parameters. Thereby, the first set for a plurality of samples only needs to be provided once for the whole slide.

In one embodiment, the first set of linear combination parameters comprise BCW weighting parameters.

In a further embodiment, the second set of linear combination parameters comprise TPM weighting parameters. With this, triangular prediction methods can be used.

In one embodiment, the second set of linear combination parameters comprise GEO weighting parameters. With this, more general modes of providing the to-be-predicted sample are provided.

In one embodiment, the combined linear combination parameter values are stored and fetched from the LUT. The LUT is a look-up table. Obtaining the values from the LUT reduces computational effort for obtaining the respective information for decoding and/or encoding.

In one embodiment, the different reference blocks comprises different uni-predicted reference blocks.

In one embodiment, at least one value of at least one weighting parameter is normalized. Normalization can simplify calculations and may even be used to reduce the size of the weighting parameter with respect to the number of bits to represent the weighting parameter.

In one embodiment, the normalization of the at least one value of the at least one weighting parameter is obtained by a right-shift operation of a result of a weight multiplication, wherein the weight multiplication is obtained by multiplying at least one position-dependent weight and a slice-level weight, and wherein the value of the shift is determined by a bitdepth of a per-sample multiplication operation of the weighted bi-prediction. In this embodiment, the slice-level weight may be a position-independent weight as those mentioned already above. The right shift operation applies a right shift of the bits representing the weight, resulting in cancelling of the least significant bits while maintaining the most significant bits. Thereby, the size of the weighting parameter (measured in bits, for example) is reduced while maintaining its information.

According to the disclosure, a method of an inter prediction process is provided, wherein the method comprising: obtaining at least two linear combination parameters, wherein the at least two linear combination parameters comprises: a first linear combination parameter of which the value is independent from the position of a to-be-predicted sample within a to-be-predicted block, and a second linear combination parameter of which the value depends on the position of the to-be-predicted sample within the to-be-predicted block; obtaining the value of the to-be-predicted sample using the at least two linear combination parameters and predicted values of at least two samples belonging to different reference blocks of the to-be-predicted block. This method allows for improved encoding and decoding using separated parameter sets that are, on one side, dependent on the position and, on the other side, independent from the position in a combined structure. This reduces the resources required for obtaining the to-be-predicted sample.

Furthermore, according to the disclosure, a method of an inter prediction process using at least two samples belonging to different reference blocks of a to-be-predicted block is provided, wherein the method comprising: Deriving combined linear combination parameters from two sets of linear combination parameters, wherein the two sets of linear combination parameters comprises: a first set of linear combination parameters of which the values are independent from the positions of the at least two samples, and a second set of linear combination parameters of which the values depend on the positions of the at least two samples; Obtaining the value of the to-be-predicted sample of the to-be-predicted block, using the combined linear combination parameters and predicted values of the at least two samples belonging to the different reference blocks of the to-bepredicted block. This method allows for improved encoding and decoding using separated parameter sets that are, on one side, dependent on the position and, on the other side, independent from the position in a combined structure. This reduces the resources required for obtaining the to-be-predicted sample.

BRIEF DESCRIPTION OF THE DRAWINGS

In the following embodiments of the disclosure are described in more detail with reference to the attached figures and drawings, in which.

Figure 1A:
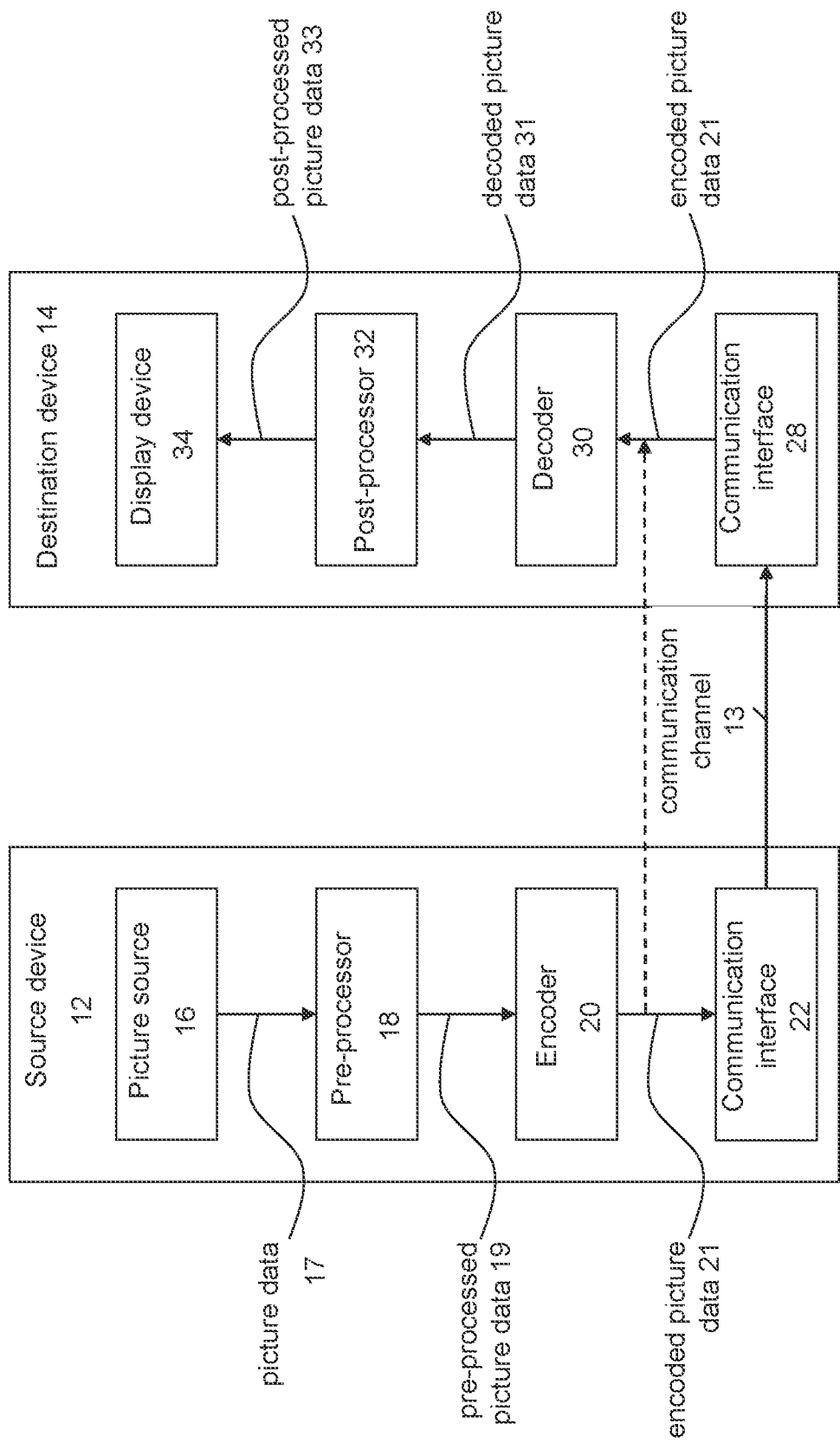
FIG. 1A is a block diagram showing an example of a video coding system configured to implement embodiments of the disclosure.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, aspects of embodiments of the disclosure or aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if an apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and two-dimension (2D) transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, generally, but not necessarily, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this application. Video encoder 20 (or short encoder 20) and video decoder 30 (or short decoder 30) of video coding system 10 represent examples of devices that may be configured to perform techniques in accordance with various examples described in the application.

As shown in FIG. 1A, the coding system 10 may comprise a source device 12 configured to provide encoded picture data 21 e.g. to a destination device 14 for decoding the encoded picture data 13.

The source device 12 may comprise an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from red, green, blue (RGB) to YCbCr), color correction, or de-noising. It can be understood that the pre-processing unit 18 may be an optional component.

In an embodiment, the video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 may comprise a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured to receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bidirectional communication interfaces, and may be configured, e.g. to send and receive messages, e.g. to set up a connection, to acknowledge and exchange any other information related to the communication link and/or data transmission, e.g. encoded picture data transmission.

In one embodiment, the decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
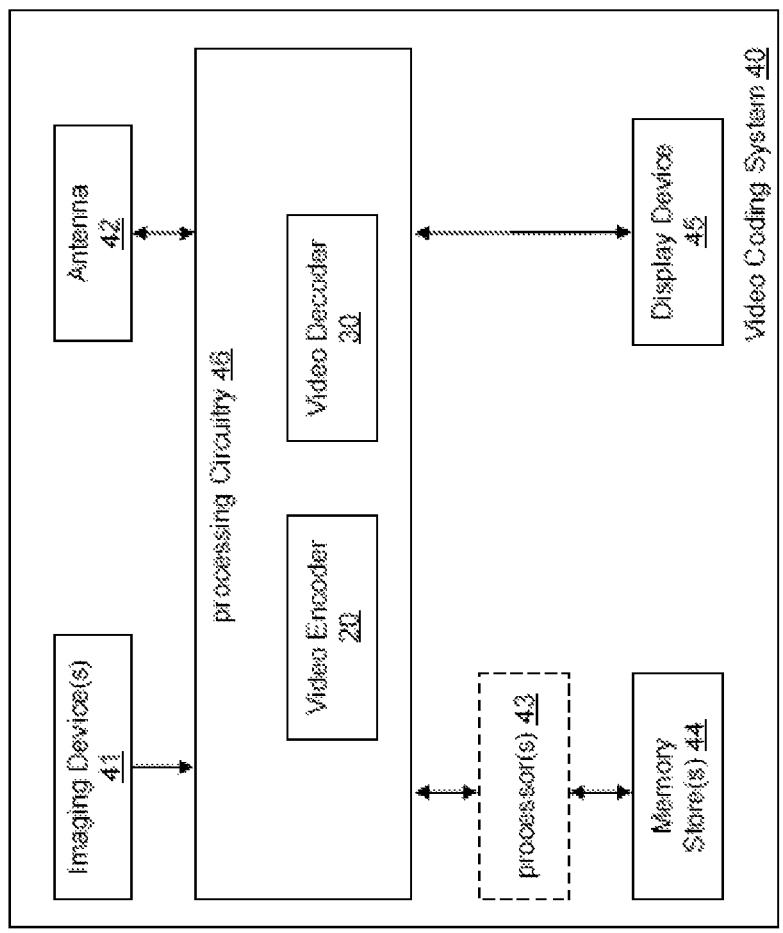
FIG. 1B is a block diagram showing another example of a video coding system configured to implement embodiments of the disclosure.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the application may apply to video coding settings (e.g., video encoding or video decoding) that do not include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of International Telecommunication Union Telecommunication Standardization Sector (ITU-T) Video Coding Experts Group (VCEG) and International Organization for Standardization (ISO)/International Electrotechnical Commission (IEC) Motion Picture Experts Group (MPEG). One of ordinary skill in the art will understand that embodiments of the disclosure are not limited to HEVC or VVC.

Encoder and Encoding Method

Figure 2:
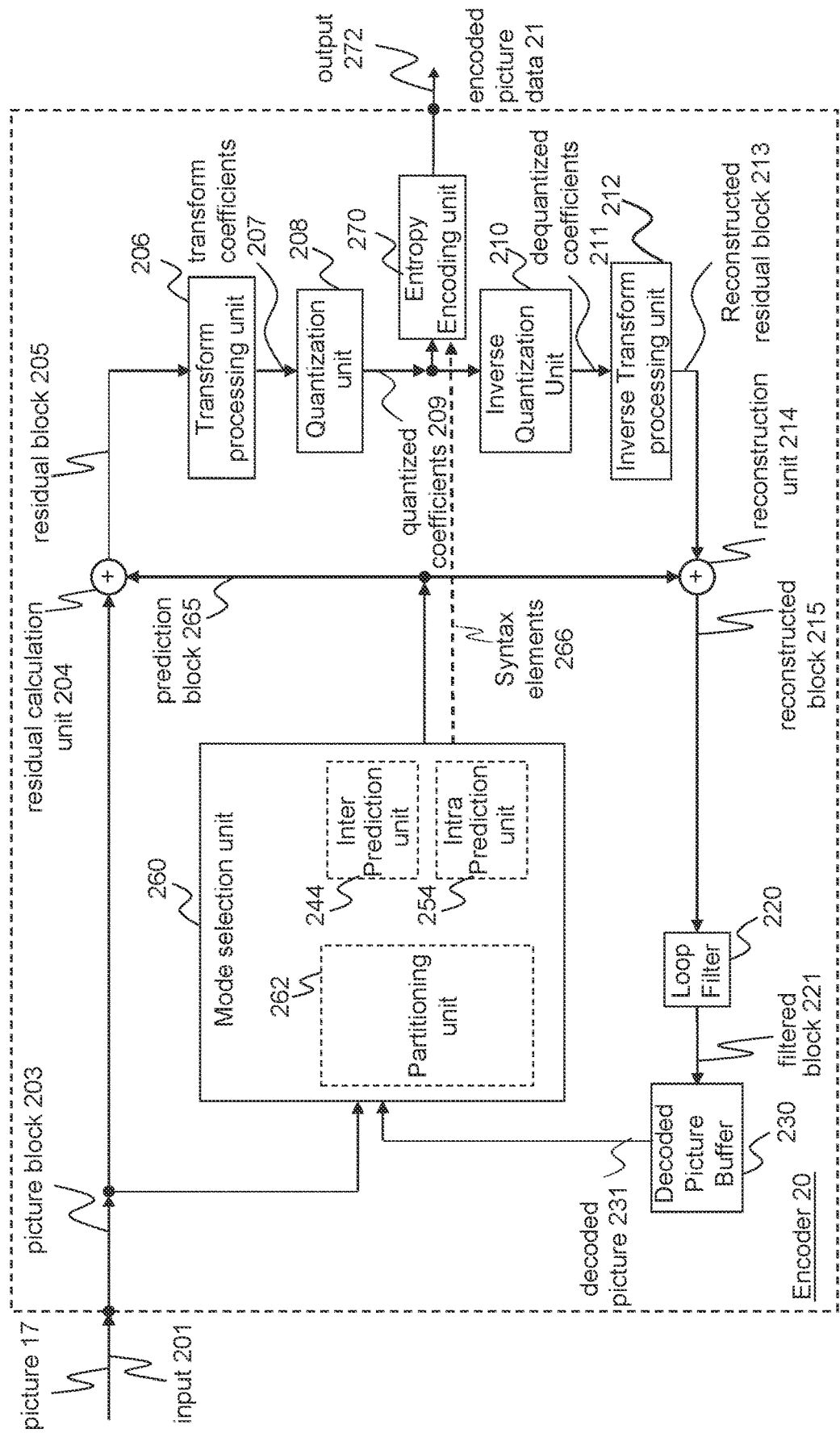
FIG. 2 is a block diagram showing an example of a video encoder configured to implement embodiments of the disclosure.

FIG. 2 shows a schematic block diagram of an example video encoder 20 that is configured to implement the techniques of the application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
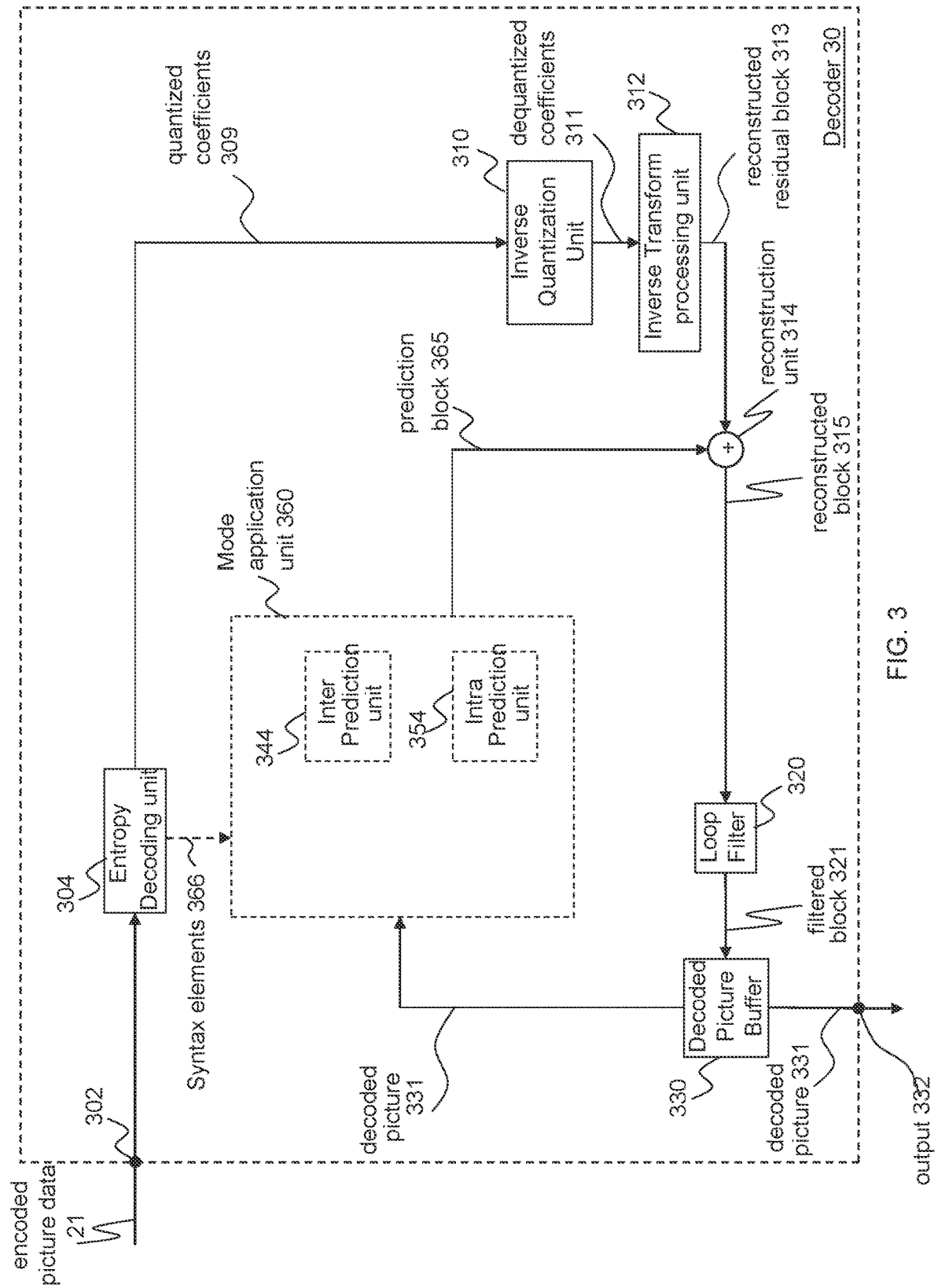
FIG. 3 is a block diagram showing an example structure of a video decoder configured to implement embodiments of the disclosure.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the DPB 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the DPB 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (e.g., Advance Video Coding (H.264/AVC)) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients. In this regard, N and M are integer values. In some embodiments, M=N, meaning the block has the same number of sample-columns as sample-rows. In other embodiments, M≠N. Any values of M and N are, in principle, possible and the values of M and N may be chosen as need be.

Embodiments of the video encoder 20 as shown in FIG. 2 may be configured to encode the picture 17 block by block, e.g. the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs).

Embodiments of the video encoder 20 as shown in FIG. 2 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Example scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. In an example, the loop filter unit is configured to smooth pixel transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

Decoded Picture Buffer

The DPB 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The DPB 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The DPB 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260, in one embodiment, comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a CTU may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. Instead of a square N×N block, also rectangular blocks with N×M size, where M≠N can be provided, in some embodiments. ACU may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a CB may be an M×N block of samples for some values of M and N such that the division of a CTB into coding blocks is a partitioning.

In embodiments, e.g., according to HEVC, a CTU may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into TUs according to another quadtree structure similar to the coding tree for the CU.

In embodiments, e.g., according to the latest video coding standard currently in development, which is referred to as VVC, a combined Quad-tree and binary tree (QTBT) partitioning is for example used to partition a coding block. In the QTBT block structure, a CU can have either a square or rectangular shape. For example, a CTU is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition may be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC.

The intra-prediction unit 254 may be configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is, in some embodiments, further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

BCW

Furthermore, a brief and more explicit overview of this form of prediction is given below. These explanations can also be found in Joint Video Experts Team (JVET)-S2002-v1, the documentation of the JVET.

In HEVC, a bi-prediction signal is generated by averaging two prediction signals obtained from two different reference pictures (or blocks or frames) and/or using two different motion vectors. In VVC, a bi-prediction mode is extended beyond simple averaging to allow weighted averaging of the two prediction signals.

$$P_{bi-pred} = ((8 - w) * P_0 + w * P_1 + 4) \gg 3$$

Here, Pbi-pred denotes the bi-predicted signal. This may have the form of a parameter value or the like. Five weights are allowed in the weighted averaging bi-prediction, w ∈ {−2, 3, 4, 5, 10}. For each bi-predicted CU, the weight w is determined in one of two ways. 1) for a non-merge CU, the weight index is signalled after the motion vector difference; 2) for a merge CU, the weight index is inferred from neighbouring blocks based on the merge candidate index. BCW is only applied to CUs with 256 or more luma samples (i.e., CU width (W) times CU height (H) is greater than or equal to 256, i.e. H·W≥256). For low-delay pictures, all five weights are used. For non-low-delay pictures, only three weights (w∈{3, 4, 5}) are used.

At the encoder, fast search algorithms may be applied to find the weight index without significantly increasing the encoder complexity. These algorithms are, for example, further specified in the VTM software and document JVET-L0646, the respective publication of the Joint Video Expert Team. When combined with adaptive motion vector resolution (AMVR), unequal weights are only conditionally checked for 1-pel and 4-pel motion vector precisions if the current picture is a low-delay picture.

When combined with affine, affine ME will be performed for unequal weights if and only if the affine mode is selected as the current best mode.

When the two reference pictures in bi-prediction are the same, unequal weights are only conditionally checked.

Unequal weights are not searched when certain conditions are met, depending on the picture order count (POC) distance between current picture and its reference pictures, the coding QP, and the temporal level.

The BCW weight index can be coded using one context coded bin followed by bypass coded bins. The first context coded bin indicates if equal weight is used; and if unequal weight is used, additional bins are signalled using bypass coding to indicate which unequal weight is used.

Weighted prediction (WP) is a coding tool supported by the H.264/AVC and HEVC standards to efficiently code video content with fading. Support for WP was also added into the VVC standard. WP allows weighting parameters (weight and offset) to be signalled for each reference picture in each of the reference picture lists L0 and L1. Then, during motion compensation, the weight(s) and offset(s) of the corresponding reference picture(s) are applied. WP and BCW are designed for different types of video content. In order to avoid interactions between WP and BCW, which will complicate VVC decoder design, if a CU uses WP, then the BCW weight index is not signalled, and w is inferred to be 4 (i.e. equal weight is applied). For a merge CU, the weight index is inferred from neighbouring blocks based on the merge candidate index. This can be applied to both normal merge mode and inherited affine merge mode. For constructed affine merge mode, the affine motion information is constructed based on the motion information of up to 3 blocks. The BCW index for a CU using the constructed affine merge mode is simply set equal to the BCW index of the first control point MV.

In VVC, CIIP and BCW cannot be jointly applied for a CU. When a CU is coded with CIIP mode, the BCW index of the current CU is set to 2, e.g. equal weight.

Geometric Partitioning Mode (GPM or GEO)

A further brief review of the Geometric Partitioning Mode, also called GPM or GEO, will be given in the following. These explanations can also be found in JVET-S2002-v1, the documentation of the Joint Video Experts Team.

In VVC, a geometric partitioning mode is supported for inter prediction. The geometric partitioning mode is signalled using a CU-level flag as one kind of merge mode, with other merge modes including the regular merge mode, the MMVD mode, the CIIP mode and the subblock merge mode. In total 64 partitions are supported by geometric partitioning mode for each possible CU size w×h=$2^m$×$2^n$ with m, n∈{3 ... 6} excluding 8×64 and 64×8.

When this mode is used, a CU is split into two parts by a geometrically located straight line. The location of the splitting line can be mathematically derived from the angle and offset parameters of a partition. Each part of a geometric partition in the CU is inter-predicted using its own motion; only uni-prediction is allowed for each partition, that is, each part has one motion vector and one reference index. The uni-prediction motion constraint is applied to ensure that same as the conventional bi-prediction, only two motion compensated prediction are needed for each CU. The uni-prediction motion for each partition is derived using the uni-prediction candidate list in the way described below.

If geometric partitioning mode is used for the current CU, then a geometric partition index indicating the partition mode of the geometric partition (angle and offset), and two merge indices (one for each partition) are further signalled. The number of maximum GPM candidate size is signalled explicitly in SPS and specifies syntax binarization for GPM merge indices. After predicting each part of the geometric partition, the sample values along the geometric partition edge are adjusted using a blending processing with adaptive weights as described below with respect to blending the two prediction signals. This is the prediction signal for the whole CU, and transform and quantization process will be applied to the whole CU as in other prediction modes. Finally, the motion field of a CU predicted using the geometric partition modes is stored for example in a motion field storage for the GPM as explained below.

The uni-prediction candidate list is derived directly from the merge candidate list constructed according to the extended merge prediction process. Denote n as the index of the uni-prediction motion in the geometric uni-prediction candidate list. The LX motion vector of the n-th extended merge candidate, with X equal to the parity of n, is used as the n-th uni-prediction motion vector for geometric partitioning mode. In case a corresponding LX motion vector of the n-th extended merge candidate does not exist, the L(1−X) motion vector of the same candidate is used instead as the uni-prediction motion vector for geometric partitioning mode.

After predicting each part of a geometric partition using its own motion, blending is applied to the two prediction signals to derive samples around geometric partition edge. The blending weight for each position of the CU can be derived based on the distance between an individual position and the partition edge.

The distance for a position (x,y) to the partition edge are derived as follows.

$$d(x, y) = (2x + 1 - w)\cos(\varphi_i) + (2y + 1 - h)\sin(\varphi_i) - \rho_j$$

$$\rho_j = \rho_{x,j}\cos(\varphi_i) + \rho_{y,j}\sin(\varphi_i)$$

$$\rho_{x,j} = \begin{cases} 0 & i \% 16 = 8 \text{ or } (i \% 16 \neq 0 \text{ and } h \geq w) \\ \pm(j \times w) \gg 2 & \text{otherwise} \end{cases}$$

-continued $$\rho_{y,j} = \begin{cases} \pm(j \times h) \gg 2 & i \% 16 = 8 \text{ or } (i \% 16 \neq 0 \text{ and } h \geq w) \\ 0 & \text{otherwise} \end{cases}$$

where i,j are the indices for angle and offset of a geometric partition, which depend on the signaled geometric partition index. The sign of $\rho_{x,j}$ and $\rho_{y,j}$ depend on angle index i.

The weights for each part of a geometric partition are derived as following.

$$wIdxL(x, y) = partIdx?32 + d(x, y): 32 - d(x, y)$$

$$w_0(x, y) = \frac{Clip3(0, 8, (wIdxL(x, y) + 4) \gg 3)}{8}$$

$$w_1(x, y) = 1 - w_0(x, y)$$

The partIdx depends on the angle index i.

Mv1 from the first part of the geometric partition, Mv2 from the second part of the geometric partition and a combined Mv of Mv1 and Mv2 are stored in the motion filed of a geometric partitioning mode coded CU.

The stored motion vector type for each individual position in the motion filed are determined as follows.

$$sType = \text{abs}(motionIdx) < 32?2 : (motionIdx \leq 0?(1 - partIdx): partIdx)$$

where motionIdx is equal to d (4x+2,4y+2), which is recalculated from equation for d(x,y). The partIdx depends on the angle index i.

If sType is equal to 0 or 1, Mv0 or Mv1 are stored in the corresponding motion field, otherwise if sType is equal to 2, a combined Mv from Mv0 and Mv2 are stored. The combined Mv are generated using the following process.

If Mv1 and Mv2 are from different reference picture lists (one from L0 and the other from L1), then Mv1 and Mv2 are simply combined to form the bi-prediction motion vectors.

Otherwise, if Mv1 and Mv2 are from the same list, only uni-prediction motion Mv2 is stored.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the DPB 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses one or more of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs).

Embodiments of the video decoder 30 as shown in FIG. 3 may be configured to partition and/or decode the picture by using tile groups (also referred to as video tile groups) and/or tiles (also referred to as video tiles), wherein a picture may be partitioned into or decoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. For example, in one embodiment, if the representing bit of motion vector is bitDepth, then the range is $-2^{(bitDepth-1)} \sim 2^{(bitDepth-1)}-1$, where "^" means exponentiation. For example, if bitDepth is set equal to 16 (i.e. 16 bit), the range is $-32768 \sim 32767$; if bitDepth is set equal to 18, the range is $-131072 \sim 131071$. For example, the value of the derived motion vector (e.g. the MVs of four 4×4 sub-blocks within one 8×8 block) is constrained such that the max difference between integer parts of the four 4×4 sub-block MVs is no more than N pixels, such as no more than 1 pixel. There are two exemplarily methods provided for constraining the motion vector according to the bitDepth.

Method 1: remove the overflow MSB (most significant bit) by flowing operations.

$$ux = (mvx + 2bitDepth)\%2bitDepth \qquad (1)$$

$$mvx = (ux >= 2bitDepth - 1)?(ux - 2bitDepth): ux \qquad (2)$$

$$uy = (mvy + 2bitDepth)\%2bitDepth \qquad (3)$$

$$mvy = (uy >= 2bitDepth - 1)?(uy - 2bitDepth): uy \qquad (4)$$

where mvx is a horizontal component of a motion vector of an image block or a sub-block, mvy is a vertical component of a motion vector of an image block or a sub-block, and ux and uy indicates an intermediate value;

For example, if the value of mvx is −32769, after applying formula (1) and (2), the resulting value is 32767. In computer system, decimal numbers are stored as two's complement. The two's complement of −32769 is 1, 0111,1111, 1111,1111 (17 bits), then the MSB is discarded, so the resulting two's complement is 0111,1111,1111,1111 (decimal number is 32767), which is same as the output by applying formula (1) and (2).

$$ux = (mvpx + mvdx + 2bitDepth)\%2bitDepth \qquad (5)$$

$$mvx = (ux >= 2bitDepth - 1)?(ux - 2bitDepth): ux \qquad (6)$$

$$uy = (mvy + 2bitDepth)\%2bitDepth \qquad (7)$$

$$mvy = (uy >= 2bitDepth - 1)?(uy - 2bitDepth): uy \qquad (8)$$

The operations may be applied during the sum of mvp and mvd, as shown in formula (5) to (8).

Method 2: remove the overflow MSB by clipping the value.

$$vx = Clip3(-2^{bitDepth} - 1, 2^{bitDepth} - 1 - 1, vx)$$
$$vy = Clip3(-2^{bitDepth} - 1, 2^{bitDepth} - 1 - 1, vy)$$

where vx is a horizontal component of a motion vector of an image block or a sub-block, vy is a vertical component of a motion vector of an image block or a sub-block; x, y and z respectively correspond to three input value of the MV clipping process, and the definition of function Clip3 is as follows.

$$Clip3(x, y, z) = \begin{cases} x; & z < x \\ y; & z > y \\ z; & otherwise \end{cases}$$

Figure 4:
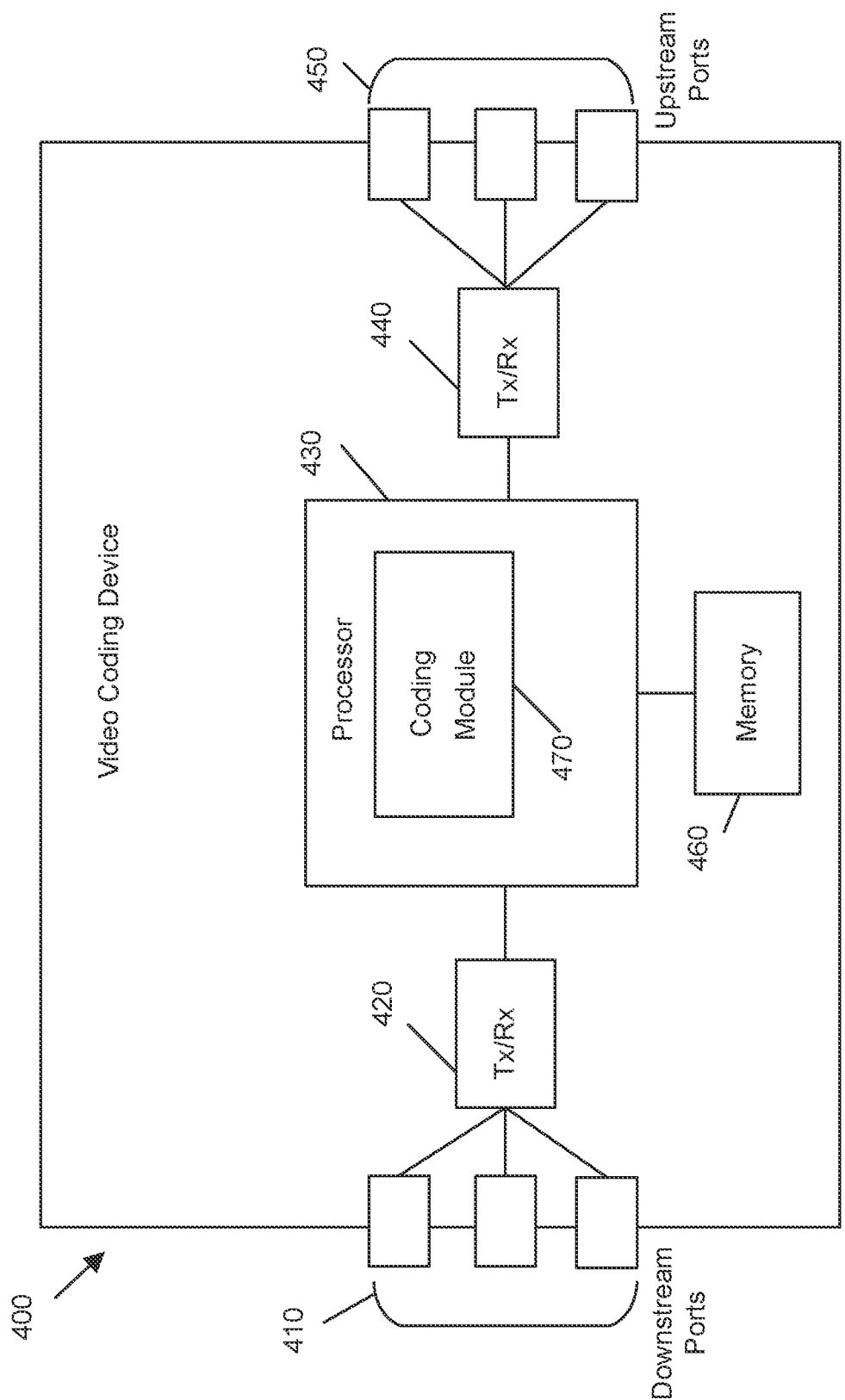
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
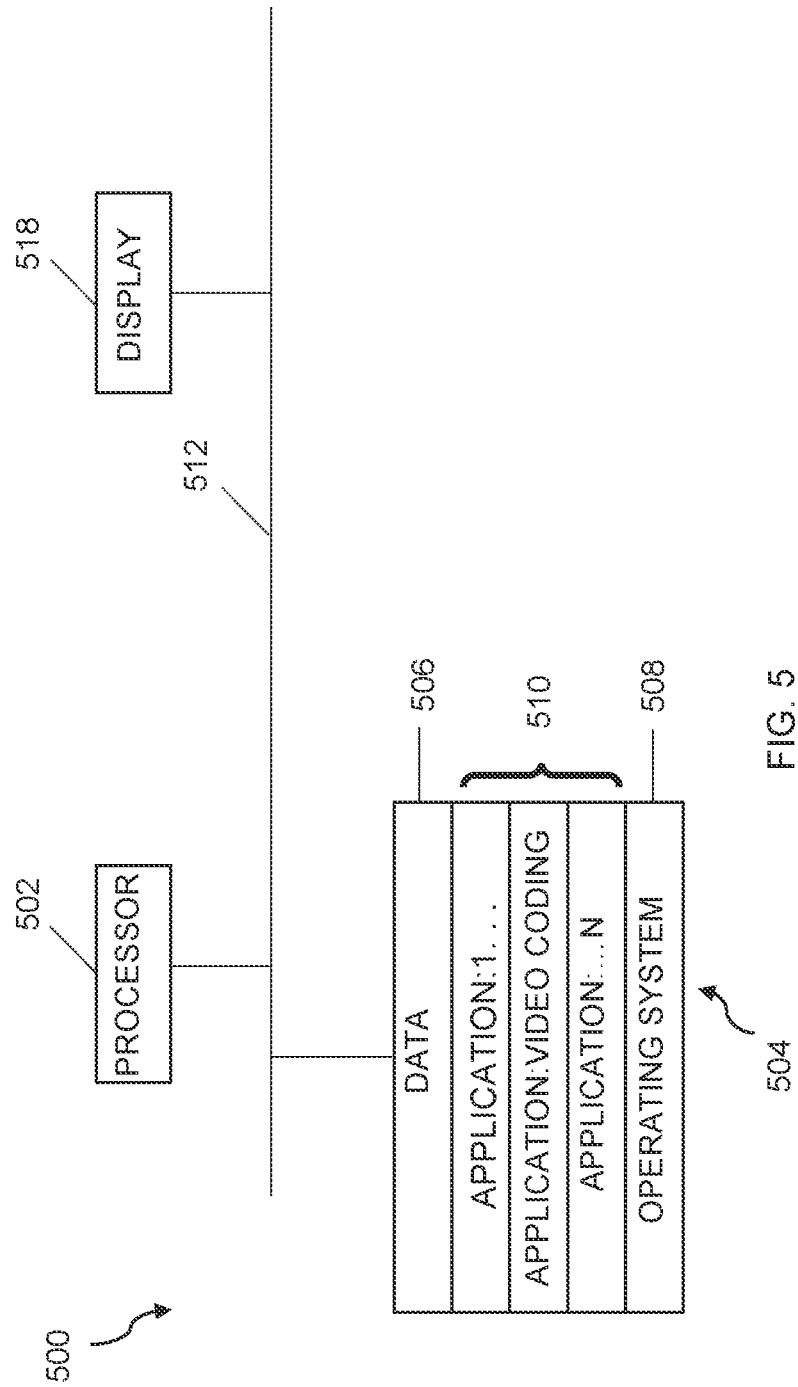
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a ROM device or a RAM device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

As mentioned in paper J. M. Boyce "Weighted prediction in the H.264/MPEG AVC video coding standard", Institute of Electrical and Electronics Engineers (IEEE) International Symposium on Circuits and Systems, May 2004, Canada, pp. 789-792, Weighted Prediction (WP) is a tool, which is particularly useful for coding fades. The WP tool has been adopted in the H.264 video coding standard's Main and Extended profiles to improve coding efficiency by applying a multiplicative weighting factor and an additive offset to the motion compensated prediction to form a weighted prediction. In explicit mode, a weighting factor and offset may be coded in the slice header for each allowable reference picture index. In implicit mode, the weighting factors are not coded but are derived based on the relative POC distances of the two reference pictures. Experimental results are provided which measure the coding efficiency improvement using WP. When coding fade-to-black sequences, bitrate reductions of up to 67% were achieved.

When applied to a single prediction, as in P pictures, WP is similar to leaky prediction, which has been previously proposed for error resiliency. Leaky prediction becomes a special case of WP, with the scaling factor limited to the range $0 \leq \alpha \leq 1$. H.264 WP allows negative scaling factors, and scaling factors greater than one. A weighting-factor is applied pixel-by-pixel using a coded label field, for efficient compression of covered and uncovered regions. A key difference of H.264's WP tool from previous proposals involving weighted prediction for compression efficiency is the association of the reference picture index with the weighting factor parameters, which allows for efficient signaling of these parameters in a multiple reference picture environment. As written in paper R. Zhang and G. Cote "accurate parameter estimation and efficient fade detection for weighted prediction in H.264 video compression", 15th IEEE International Conference on Image Processing, October 2008, San Diego, California, US, pp. 2836-2839, the procedure of applying WP in a real-time encoding system can be formalized as a sequence of steps shown in FIG. 6. First, some statistics 611 are generated through video analysis 610. The statistics 611 within a small window, from several previous pictures till the current picture, are then used to detect fade. Each picture is assigned a state value 631 indicating if the picture is in the state of NORMAL or in the state of FADE. Such state values are saved for each picture. When encoding a picture, if there is a FADE state in either the current picture or one of its reference pictures, the WP will be used for this current-reference pair, and statistics of current picture and the corresponding reference picture are processed at step 650 to estimate the WP parameters. These parameters are then passed on to the encoding engine 660. Otherwise, the normal encoding is done.

As mentioned in paper A. Leontaris and A. M. Tourapis "Weighted prediction methods for improved motion compensation", 16th IEEE International Conference on Image Processing (ICIP), November 2009, Cairo, Egypt, pp. 1029-1032, a macroblock in H.264 is divided into macroblock partitions. For each macroblock partition, a reference is selected from each one of the available reference lists (frequently denoted in specifications as RefPicList), list 0 for P or B-coded slices or reference list 1 for B-coded slices. The references used may be different for each partition.

Using these references a prediction block is generated for each list, e.g., P for single list prediction and P0 and P1 for bi-prediction, using motion information with, optionally, subpixel precision. The prediction blocks may be further processed depending on the availability of weighted prediction for the current slice. For P slices, the WP parameters are transmitted at the slice header. For B slices, there are two options. In the explicit WP, the parameters are transmitted in the slice header, and in the implicit WP the parameters are derived based on the POC number that is signaled in the slice header. In this paper we will only focus on explicit WP and how this method could be used to improve motion compensation performance. Note that in HEVC and VVC, PB is used similarly to macroblock partition in AVC.

For P slices or single-list explicit WP in B slices, the prediction block is drawn from a single reference. Let p denote a sample value in prediction block P. If weighted prediction is not used, then the final inter prediction sample is f=p. Otherwise the predicted sample is as follows.

$$f = \begin{cases} ((p \times w_x + 2^{logWD-1}) \gg logWD) + o_x, & logWD \geq 1 \\ (p \times w_x + O_x), & \text{otherwise} \end{cases}.$$

Terms wx and ox are the WP gain and offset parameters for reference list x. Term log WD is transmitted in the bit stream and controls the mathematical precision of the weighted prediction process. For log WD≥1, the expression above rounds away from zero. Similarly, for bi-prediction, two prediction blocks, one for each reference list, are considered. Let p0 and p1 denote samples in each of the two prediction blocks P0 and P1. If weighted prediction is not used, prediction is performed as follows.

$$f = (p_0 \times p_1 + 1) \gg 1).$$

For weighted bi-prediction, prediction is performed as follows.

$$f = ((p_0 + w_0 + p_1 \times w_1 + 2^{logWD}) \gg (logWD + 1)) + ((o_0 + o_1 + 1) \gg 1).$$

It is worth noting weighted prediction can compensate for illumination changes, such as a fade-in, fade-out, or a cross-fade.

On high level in VVC, weighted prediction is signaled in SPS, PPS and slice header. In SPS, the following syntax elements are used for that sps_weighted_pred_flag equal to 1 specifies that weighted prediction may be applied to P slices referring to the SPS. sps_weighted_pred_flag equal to 0 specifies that weighted prediction is not applied to P slices referring to the SPS; sps_weighted_bipred_flag equal to 1 specifies that explicit weighted prediction may be applied to B slices referring to the SPS. sps_weighted_bipred_flag equal to 0 specifies that explicit weighted prediction is not applied to B slices referring to the SPS.

In PPS, the following syntax elements are used for that pps_weighted_pred_flag equal to 0 specifies that weighted prediction is not applied to P slices referring to the PPS. pps_weighted_pred_flag equal to 1 specifies that weighted prediction is applied to P slices referring to the PPS. When sps_weighted_pred_flag is equal to 0, the value of pps_weighted_pred_flag shall be equal to 0; pps_weighted_bipred_flag equal to 0 specifies that explicit weighted prediction is not applied to B slices referring to the PPS. pps_weighted_bipred_flag equal to 1 specifies that explicit weighted prediction is applied to B slices referring to the PPS. When sps_weighted_bipred_flag is equal to 0, the value of pps_weighted_bipred_flag shall be equal to 0.

These modes of signaling are, however, only two embodiments. Also other ways of signaling the weighted prediction can be used.

In general, in some embodiments, a first set of linear combination parameter(s) (also referred to as weighting parameters) comprising at least one parameter can be signaled in the slice header. This first set of linear combination parameters only comprises parameters that are independent from a position of a to-be-predicted sample within a to-be-predicted block.

In slice header, weighted prediction parameters can be signaled as pred_weight_table( ) structured as in Table 1 and containing the following elements such as luma_log2_weight_denom that is the base 2 logarithm of the denominator for all luma weighting factors. The value of luma_log2_weight_denom shall be in the range of 0 to 7, inclusive. delta_chroma_log2_weight_denom is the difference of the base 2 logarithm of the denominator for all chroma weighting factors. When delta_chroma_log2_weight_denom is not present, it is inferred to be equal to 0.

The variable ChromaLog2WeightDenom is derived to be equal to luma_log2_weight_denom+delta_chroma_log2_weight_denom and the value shall be in the range of 0 to 7, inclusive. luma_weight_l0_flag[i] equal to 1 specifies that weighting factors for the luma component of list 0 prediction using RefPicList[0][i] are present. luma_weight_l0_flag[i] equal to 0 specifies that these weighting factors are not present. chroma_weight_l0_flag[i] equal to 1 specifies that weighting factors for the chroma prediction values of list 0 prediction using RefPicList[0][i] are present. chroma_weight_l0_flag[i] equal to 0 specifies that these weighting factors are not present. When chroma_weight_l0_flag[i] is not present, it is inferred to be equal to 0. delta_luma_weight_l0[i] is the difference of the weighting factor applied to the luma prediction value for list 0 prediction using RefPicList[0][i].

The variable LumaWeightL0[i] is derived to be equal to (1<<luma_log2_weight_denom)+delta_luma_weight_l0[i]. When luma_weight_l0_flag[i] is equal to 1, the value of delta_luma_weight_l0[i] shall be in the range of 128 to 127, inclusive. When luma_weight_l0_flag[i] is equal to 0, LumaWeightL0[i] is inferred to be equal to 2luma_log2_weight_denom. luma_offset_0[i] is the additive offset applied to the luma prediction value for list 0 prediction using RefPicList[0][i]. The value of luma_offset_0[i] shall be in the range of 128 to 127, inclusive. When luma_weight_l0_flag[i] is equal to 0, luma_offset_0[i] is inferred to be equal to 0. delta_chroma_weight_l0[i][j] is the difference of the weighting factor applied to the chroma prediction values for list 0 prediction using RefPicList[0][i] with j equal to 0 for Cb and j equal to 1 for Cr.

The variable ChromaWeightL0[i][j] is derived to be equal to (1<<ChromaLog2WeightDenom)+delta_chroma_weight_l0[i][j]. When chroma_weight_l0_flag[i] is equal to 1, the value of delta_chroma_weight_l0[i][j] shall be in the range of 128 to 127, inclusive. When chroma_weight_l0_flag[i] is equal to 0, ChromaWeightL0[i][j] is inferred to be equal to 2ChromaLog2WeightDenom. delta_chroma_offset_l0[i][j] is the difference of the additive offset applied to the chroma prediction values for list 0 prediction using RefPicList[0][i] with j equal to 0 for Cb and j equal to 1 for Cr.

The variable ChromaOffsetL0[i][j] is derived as follows. ChromaOffsetL0[i][j]=Clip3(−128,127, (128+delta_chroma_offset_l0[i][j] ((128*ChromaWeightL0[i][j])>>ChromaLog2WeightDenom)))

The value of delta_chroma_offset_l0[i][j] shall be in the range of −4*128 to 4*127, inclusive. When chroma_weight_l0_flag[i] is equal to 0, ChromaOffsetL0[i][j] is inferred to be equal to 0. luma_weight_l1_flag[i], chroma_weight_l1_flag[i], delta_luma_weight_l1[i], luma_offset_l1[i], delta_chroma_weight_l1[i][j] and delta_chroma_offset_l1[i][j] have the same semantics as luma_weight_l0_flag[i], chroma_weight_l0_flag[i], delta_luma_weight_l0[i], luma_offset_0[i], delta_chroma_weight_l0[i][j] and delta_chroma_offset_l0[i][j], respectively, with l0, L0, list 0 and List0 replaced by l1, L1, list 1 and List1, respectively.

The variable sumWeightL0Flags is derived to be equal to the sum of luma_weight_l0_flag[i]+2*chroma_weight_l0_flag[i], for i=0 . . . NumRefIdxActive[0]−1.

When slice type is equal to B, the variable sumWeightL1Flags is derived to be equal to the sum of luma_weight_l1_flag[i]+2*chroma_weight_l1_flag[i], for i=0 . . . NumRefIdxActive[1]−1.

It is a requirement of bitstream conformance that, when slice type is equal to P, sumWeightL0Flags shall be less than or equal to 24 and when slice type is equal to B, the sum of sumWeightL0Flags and sumWeightL1Flags shall be less than or equal to 24.

TABLE 1

Weighted prediction parameters syntax

|  | Descriptor |
|---|---|
| pred_weight_table( ) { |  |
|   luma_log2_weight_denom | ue(v) |
|   if( ChromaArrayType != 0 ) |  |
|     delta_chroma_log2_weight_denom | se(v) |
|   for( i = 0; i < NumRefIdxActive[ 0 ]; i++ ) |  |
|     luma_weight_l0_flag[ i ] | u(1) |
|   if( ChromaArrayType != 0 ) |  |
|     for( i = 0; i < NumRefIdxActive[ 0 ]; i++ ) |  |
|       chroma_weight_l0_flag[ i ] | u(1) |
|   for( i = 0; i < NumRefIdxActive[ 0 ]; i++ ) { |  |
|     if( luma_weight_l0_flag[ i ] ) { |  |
|       delta_luma_weight_l0[ i ] | se(v) |
|       luma_offset_l0[ i ] | se(v) |
|     } |  |
|     if( chroma_weight_l0_flag[ i ] ) |  |
|       for( j = 0; j < 2; j++ ) { |  |
|         delta_chroma_weight_l0[ i ][ j ] | se(v) |
|         delta_chroma_offset_l0[ i ][ j ] | se(v) |
|       } |  |
|   } |  |
|   if( slice_type = = B ) { |  |
|     for( i = 0; i < NumRefIdxActive[ 1 ]; i++ ) |  |
|       luma_weight_l1_flag[ i ] | u(1) |
|     if( ChromaArrayType != 0 ) |  |
|       for( i = 0; i < NumRefIdxActive[ 1 ]; i++ ) |  |
|         chroma_weight_l1_flag[ i ] | u(1) |
|     for( i = 0; i < NumRefIdxActive[ 1 ]; i++ ) { |  |
|       if( luma_weight_l1_flag[ i ] ) { |  |
|         delta_luma_weight_l1[ i ] | se(v) |
|         luma_offset_l1[ i ] | se(v) |
|       } |  |
|       if( chroma_weight_l1_flag[ i ] ) |  |
|         for( j = 0; j < 2; j++ ) { |  |
|           delta_chroma_weight_l1[ i ][ j ] | se(v) |
|           delta_chroma_offset_l1[ i ][ j ] | se(v) |
|         } |  |
|     } |  |
|   } |  |
| } |  |

In contribution Joint Video Experts Team (JVET)-O0244 (V. Seregin et al "AHG17: On zero delta POC in reference picture structure," 15th JVET meeting, Gothenburg, Sweden), it was pointed out that in the current VVC specification draft, reference pictures are signaled in the reference picture structure (RPS), where abs_delta_poc_st represents the delta POC value, which can be equal to 0. RPS can be signaled in SPS and slice header. This functionality is needed to signal different weights for the same reference picture, and potentially is needed if layered scalability is supported with the same POC values used across layers in access unit. Therein, it is stated that the repeating reference pictures are not needed when weighted prediction is not enabled. Among others, in this contribution, it is proposed to disallow zero delta POC values when weighted prediction is not enabled.

TABLE 2

Sequence parameter set RBSP (Raw Byte Sequence Payload) syntax

| | Descriptor |
|---|---|
| seq_parameter_set_rbsp( ) { | |
|   sps_decoding_parameter_set_id | u(4) |
|   sps_video_parameter_set_id | u(4) |
|   sps_max_sub_layers_minus1 | u(3) |
|   sps_reserved_zero_5bits | u(5) |
|   profile_tier_level( sps_max_sub_layers_minus1 ) | |
|   gdr_enabled_flag | u(1) |
|   sps_seq_parameter_set_id | ue(v) |
|   chroma_format_idc | ue(v) |
|   if( chroma_format_idc = = 3 ) | |
|     separate_colour_plane_flag | u(1) |
|   pic_width_max_in_luma_samples | ue(v) |
|   pic_height_max_in_luma_samples | ue(v) |
|   subpics_present_flag | u(1) |
|   if( subpics_present_flag ) { | |
|     max_subpics_minus1 | u(8) |
|     subpic_grid_col_width_minus1 | u(v) |
|     subpic_grid_row_height_minus1 | u(v) |
|     for( i = 0; i < NumSubPicGridRows; i++ ) | |
|       for( j = 0; j < NumSubPicGridCols; j++ ) | |
|         subpic_grid_idx[ i ][ j ] | u(v) |
|     for( i = 0; i <= NumSubPics; i++ ) { | |
|       subpic_treated_as_pic_flag[ i ] | u(1) |
|       loop_filter_across_subpic_enabled_flag[ i ] | u(1) |
|     } | |
|   } | |
|   bit_depth_luma_minus8 | ue(v) |
|   bit_depth_chroma_minus8 | ue(v) |
|   min_qp_prime_ts_minus4 | ue(v) |
|   log2_max_pic_order_cnt_lsb_minus4 | ue(v) |
|   if( sps_max_sub_layers_minus1 > 0 ) | |
|     sps_sub_layer_ordering_info_present_flag | u(1) |
|   for(i=(sps_sub_layer_ordering_info_present_flag?0: sps_max_sub_layers_minus ); | |
|     i <= sps_max_sub_layers_minus1; i++ ) { | |
|     sps_max_dec_pic_buffering_minus1[ i ] | ue(v) |
|     sps_max_num_reorder_pics[ i ] | ue(v) |
|     sps_max_latency_increase_plus1[ i ] | ue(v) |
|   } | |
|   long_term_ref_pics_flag | u(1) |
|   inter_layer_ref_pics_present_flag | u(1) |
|   sps_idr_rpl_present_flag | u(1) |
|   rpl1_same_as_rpl0_flag | u(1) |
|   for( i = 0; i < !rpl1_same_as_rpl0_flag ? 2 : 1; i++ ) { | |
|     num_ref_pic_lists_in_sps[ i ] | ue(v) |
|     for( j = 0; j < num_ref_pic_lists_in_sps[ i ]; j++ ) | |
|       ref_pic_list_struct( i, j ) | |
|   } | |
|   if( ChromaArrayType != 0 ) | |
|     qtbtt_dual_tree_intra_flag | u(1) |
|   log2_ctu_size_minus5 | u(2) |
|   log2_min_luma_coding_block_size_minus2 | ue(v) |
|   partition_constraints_override_enabled_flag | u(1) |
|   sps_log2_diff_min_qt_min_cb_intra_slice_luma | ue(v) |
|   sps_log2_diff_min_qt_min_cb_inter_slice | ue(v) |
|   sps_max_mtt_hierarchy_depth_inter_slice | ue(v) |
|   sps_max_mtt_hierarchy_depth_intra_slice_luma | ue(v) |
|   if( sps_max_mtt_hierarchy_depth_intra_slice_luma != 0 ) { | |
|     sps_log2_diff_max_bt_min_qt_intra_slice_luma | ue(v) |
|     sps_log2_diff_max_tt_min_qt_intra_slice_luma | ue(v) |
|   } | |
|   if( sps_max_mtt_hierarchy_depth_inter_slices != 0 ) { | |
|     sps_log2_diff_max_bt_min_qt_inter_slice | ue(v) |
|     sps_log2_diff_max_tt_min_qt_inter_slice | ue(v) |
|   } | |
|   if( qtbtt_dual_tree_intra_flag ) { | |
|     sps_log2_diff_min_qt_min_cb_intra_slice_chroma | ue(v) |
|     sps_max_mtt_hierarchy_depth_intra_slice_chroma | ue(v) |
|     if ( sps_max_mtt_hierarchy_depth_intra_slice_chroma != 0 ) { | |
|       sps_log2_diff_max_bt_min_qt_intra_slice_chroma | ue(v) |
|       sps_log2_diff_max_tt_min_qt_intra_slice_chroma | ue(v) |
|     } | |
|   } | |
|   sps_max_luma_transform_size_64_flag | u(1) |
|   if( ChromaArrayType != 0 ) { | |

TABLE 2-continued

Sequence parameter set RBSP (Raw Byte Sequence Payload) syntax

| | Descriptor |
|---|---|
|   same_qp_table_for_chroma | u(1) |
|   for( i = 0; i < same_qp_table_for_chroma ? 1 : 3; i++ ) { | |
|     num_points_in_qp_table_minus1[ i ] | ue(v) |
|     for( j = 0; j <= num_points_in_qp_table_minus1[ i ]; j++ ) { | |
|       delta_qp_in_val_minus1[ i ][ j ] | ue(v) |
|       delta_qp_out_val[ i ][ j ] | ue(v) |
|     } | |
|   } | |
| } | |
| sps_weighted_pred_flag | u(1) |
| sps_weighted_bipred_flag | u(1) |
| sps_sao_enabled_flag | u(1) |
| sps_alf_enabled_flag | u(1) |
| sps_transform_skip_enabled_flag | u(1) |
| if( sps_transform_skip_enabled_flag ) | |
|   sps_bdpcm_enabled_flag | u(1) |
| sps_joint_cbcr_enabled_flag | u(1) |
| sps_ref_wraparound_enabled_flag | u(1) |
| if( sps_ref_wraparound_enabled_flag ) | |
|   sps_ref_wraparound_offset_minus1 | ue(v) |
| sps_temporal_mvp_enabled_flag | u(1) |
| if( sps_temporal_mvp_enabled_flag ) | |
|   sps_sbtmvp_enabled_flag | u(1) |
| sps_amvr_enabled_flag | u(1) |
| sps_bdof_enabled_flag | u(1) |
| sps_smvd_enabled_flag | u(1) |
| sps_dmvr_enabled_flag | u(1) |
| if( sps_bdof_enabled_flag | | sps_dmvr_enabled_flag ) | |
|   sps_bdof_dmvr_slice_present_flag | u(1) |
| sps_mmvd_enabled_flag | u(1) |
| sps_isp_enabled_flag | u(1) |
| sps_mrl_enabled_flag | u(1) |
| sps_mip_enabled_flag | u(1) |
| if( ChromaArrayType != 0 ) | |
|   sps_cclm_enabled_flag | u(1) |
|   if( sps_cclm_enabled_flag && chroma_format_idc = = 1 ) | |
|     sps_cclm_colocated_chroma_flag | u(1) |
| sps_mts_enabled_flag | u(1) |
| if( sps_mts_enabled_flag ) { | |
|   sps_explicit_mts_intra_enabled_flag | u(1) |
|   sps_explicit_mts_inter_enabled_flag | u(1) |
| } | |
| sps_sbt_enabled_flag | u(1) |
| if( sps_sbt_enabled_flag ) | |
|   sps_sbt_max_size_64_flag | u(1) |
| sps_affine_enabled_flag | u(1) |
| if( sps_affine_enabled_flag ) { | |
|   sps_affine_type_flag | u(1) |
|   sps_affine_amvr_enabled_flag | u(1) |
|   sps_affine_prof_enabled_flag | u(1) |
| } | |
| if( chroma_format_idc = = 3 ) | |
|   sps_palette_enabled_flag | u(1) |
| sps_bcw_enabled_flag | u(1) |
| sps_ibc_enabled_flag | u(1) |
| sps_ciip_enabled_flag | u(1) |
| if( sps_mmvd_enabled_flag ) | |
|   sps_fpel_mmvd_enabled_flag | u(1) |
| sps_triangle_enabled_flag | u(1) |
| sps_lmcs_enabled_flag | u(1) |
| sps_lfnst_enabled_flag | u(1) |
| sps_ladf_enabled_flag | u(1) |
| if ( sps_ladf_enabled_flag ) { | |
|   sps_num_ladf_intervals_minus2 | u(2) |
|   sps_ladf_lowest_interval_qp_offset | se(v) |
|   for( i = 0; i < sps_num_ladf_intervals_minus2 + 1; i++ ) { | |
|     sps_ladf_qp_offset[ i ] | se(v) |
|     sps_ladf_delta_threshold_minus1[ i ] | ue(v) |
|   } | |
| } | |
| sps_scaling_list_enabled_flag | u(1) |
| hrd_parameters_present_flag | u(1) |
| if( general_hrd_parameters_present_flag ) { | |
|   num_units_in_tick | u(32) |
|   time_scale | u(32) |

TABLE 2-continued

Sequence parameter set RBSP (Raw Byte Sequence Payload) syntax

| | Descriptor |
|---|---|
| sub_layer_cpb_parameters_present_flag | u(1) |
| if( sub_layer_cpb_parameters_present_flag ) | |
| general_hrd_parameters( 0, sps_max_sub_layers_minus1 ) | |
| else | |
| general_hrd_parameters( sps_max_sub_layers_minus1, sps_max_sub_layers_minus1 ) | |
| } | |
| vui_parameters_present_flag | u(1) |
| if( vui_parameters_present_flag ) | |
| vui_parameters( ) | |
| sps_extension_flag | u(1) |
| if( sps_extension_flag ) | |
| while( more_rbsp_data( ) ) | |
| sps_extension_data_flag | u(1) |
| rbsp_trailing_bits( ) | |
| } | |

TABLE 3

Reference picture list structure syntax

| | Descriptor |
|---|---|
| ref_pic_list_struct( listIdx, rplsIdx ) { | |
| num_ref_entries[ listIdx ][ rplsIdx ] | ue(v) |
| if( long_term_ref_pics_flag ) | |
| ltrp_in_slice_header_flag[ listIdx ][ rplsIdx ] | u(1) |
| for( i = 0, j = 0; i < num_ref_entries[ listIdx ][ rplsIdx ]; i++ ) { | |
| if( inter_layer_ref_pics_present_flag ) | |
| inter_layer_ref_pic_flag[ listIdx ][ rplsIdx ][ i ] | u(1) |
| if( !inter_layer_ref_pics_flag[ listIdx ][ rplsIdx ][ i ] ) { | |
| if( long_term_ref_pics_flag ) | |
| st_ref_pic_flag[ listIdx ][ rplsIdx ][ i ] | u(1) |
| if( st_ref_pic_flag[ listIdx ][ rplsIdx ][ i ] ) { | |
| abs_delta_poc_st[ listIdx ][ rplsIdx ][ i ] | ue(v) |
| if( AbsDeltaPocSt[ listIdx ][ rplsIdx ][ i ] > 0 ) | |
| strp_entry_sign_flag[ listIdx ][ rplsIdx ][ i ] | u(1) |
| } else if( !ltrp_in_slice_header_flag[ listIdx ][ rplsIdx ] ) | |
| rpls_poc_lsb_lt[ listIdx ][ rplsIdx ][ j++ ] | u(v) |
| } else | |
| ilrp_idc[ listIdx ][ rplsIdx ][ i ] | ue(v) |
| } | |
| } | |

The ref_pic_list_struct(listIdx, rplsIdx) syntax structure may be present in an SPS or in a slice header. Depending on whether the syntax structure is included in a slice header or an SPS, the following applies.

If present in a slice header, the ref_pic_list_struct(listIdx, rplsIdx) syntax structure specifies reference picture list listIdx of the current picture (the picture containing the slice).

Otherwise (present in an SPS), the ref_pic_list_struct (listIdx, rplsIdx) syntax structure specifies a candidate for reference picture list listIdx, and the term "the current picture" in the semantics specified in the remainder of this clause refers to each picture that (1) has one or more slices containing ref_pic_list_idx[listIdx] equal to an index into the list of the ref_pic_list_struct(listIdx, rplsIdx) syntax structures included in the SPS, and (2) is in a CVS that refers to the SPS.

num_ref_entries[listIdx][rplsIdx] specifies the number of entries in the ref_pic_list_struct(listIdx, rplsIdx) syntax structure. The value of num_ref_entries[listIdx][rplsIdx] shall be in the range of 0 to sps_max_decpic_buffering_minus1+14, inclusive. ltrp_in_slice_header_flag[listIdx][rplsIdx] equal to 0 specifies that the POC LSBs of the LTRP entries in the ref_pic_list_struct(listIdx, rplsIdx) syntax structure are present in the ref_pic_list_struct(listIdx, rplsIdx) syntax structure. ltrp_in_slice_header_flag[listIdx][rplsIdx] equal to 1 specifies that the POC LSBs of the LTRP entries in the ref_pic_list_struct(listIdx, rplsIdx) syntax structure are not present in the ref_pic_list_struct(listIdx, rplsIdx) syntax structure. inter_layer_ref_pic_flag[listIdx][rplsIdx][i] equal to 1 specifies that the i-th entry in the ref_pic_list_struct(listIdx, rplsIdx) syntax structure is an ILRP entry. inter_layer_ref_pic_flag[listIdx][rplsIdx][i] equal to 0 specifies that the i-th entry in the ref_pic_list_struct(listIdx, rplsIdx) syntax structure is not an ILRP entry. When not present, the value of inter_layer_ref_pic_flag[listIdx][rplsIdx][i] is inferred to be equal to 0. st_ref_pic_flag[listIdx][rplsIdx][i] equal to 1 specifies that the i-th entry in the ref_pic_list_struct (listIdx, rplsIdx) syntax structure is an STRP entry. st_ref_pic_flag[listIdx][rplsIdx][i] equal to 0 specifies that the i-th entry in the ref_pic_list_struct(listIdx, rplsIdx) syntax structure is an LTRP entry. When inter_layer_ref_pic_flag[listIdx][rplsIdx][i] is equal to 0 and st_ref_pic_flag[listIdx][rplsIdx][i] is not present, the value of st_ref_pic_flag[listIdx][rplsIdx][i] is inferred to be equal to 1.

The variable NumLtrpEntries[listIdx][rplsIdx] is derived as follows. for (i=0, NumLtrpEntries[listIdx][rplsIdx]=0; i<num_ref_entries[listIdx][rplsIdx]; i++) if (!inter_layer_ref_pic_flag[listIdx][rplsIdx][i] && !st_ref_pic_flag[listIdx][rplsIdx][i])
NumLtrpEntries[listIdx][rplsIdx]++
abs_delta_poc_st[listIdx][rplsIdx][i] specifies the value of the variable AbsDeltaPocSt[listIdx][rplsIdx][i] as follows.
   if (sps_weighted_pred_flag||sps_weighted_bipred_flag)
     AbsDeltaPocSt[listIdx][rplsIdx][i]=abs_delta_poc_st[listIdx][rplsIdx][i]
   else
     AbsDeltaPocSt[listIdx][rplsIdx][i]=abs_delta_poc_st[listIdx][rplsIdx][i]+1

The value of abs_delta_poc_st[listIdx][rplsIdx][i] shall be in the range of 0 to 215−1, inclusive. strp_entry_sign_flag[listIdx][rplsIdx][i] equal to 1 specifies that i-th entry in the syntax structure ref_pic_list_struct(listIdx, rplsIdx) has a value greater than or equal to 0. strp_entry_sign_flag[listIdx][rplsIdx][i] equal to 0 specifies that the i-th entry in the syntax structure ref_pic_list_struct(listIdx, rplsIdx) has a value less than 0. When not present, the value of strp_entry_sign_flag[listIdx][rplsIdx][i] is inferred to be equal to 1.

The list DeltaPocValSt[listIdx][rplsIdx] is derived as follows. for (i=0; i<num_ref_entries[listIdx][rplsIdx]; i++)
   if(!inter_layer_ref_pic_flag[listIdx][rplsIdx][i]&&st_ref_pic_flag[listIdx][rplsIdx][i])
     DeltaPocValSt[listIdx][rplsIdx][i]=(strp_entry_sign_flag[listIdx][rplsIdx][i])?
     AbsDeltaPocSt[listIdx][rplsIdx][i]: 0−AbsDeltaPocSt[listIdx][rplsIdx][i]

rpls_poc_lsb_lt[listIdx][rplsIdx][i] specifies the value of the picture order count modulo MaxPicOrderCntLsb of the picture referred to by the i-th entry in the ref_pic_list_struct (listIdx, rplsIdx) syntax structure.

The length of the rpls_poc_lsb_lt[listIdx][rplsIdx][i] syntax element is log2_max_pic_order_cnt_lsb_minus4+4 bits.

ilrp_idc[listIdx][rplsIdx][i] specifies the index, to the list of directly dependent layers, of the ILRP of i-th entry in ref_pic_list_struct(listIdx, rplsIdx) syntax structure to the list of directly dependent layers. The value of ilrp_idc[listIdx][rplsIdx][i] shall be in the range of 0 to the GeneralLayerIdx[nuh_layer_id]−1, inclusive.

In Table 2, weighted prediction parameters are signaled after reference picture list signaling. In Table 4, these syntax elements are reordered to restrict binarization of delta POC syntax element based on the values of the weighted prediction flags.

TABLE 4

| Modified syntax of sequence parameter set RBSP | |
|---|---|
| | Descriptor |
| seq_parameter_set_rbsp( ) { | |
|   sps_decoding_parameter_set_id | u(4) |
|   sps_video_parameter_set_id | u(4) |
|   sps_max_sub_layers_minus1 | u(3) |
|   sps_reserved_zero_5bits | u(5) |
|   profile_tier_level( sps_max_sub_layers_minus1 ) | |
|   gdr_enabled_flag | u(1) |
|   sps_seq_parameter_set_id | ue(v) |

TABLE 4-continued

| Modified syntax of sequence parameter set RBSP | |
|---|---|
| | Descriptor |
|   chroma_format_idc | ue(v) |
|   if( chroma_format_idc = = 3 ) | |
|     separate_colour_plane_flag | u(1) |
|   pic_width_max_in_luma_samples | ue(v) |
|   pic_height_max_in_luma_samples | ue(v) |
|   subpics_present_flag | u(1) |
|   if( subpics_present_flag ) { | |
|     max_subpics_minus1 | u(8) |
|     subpic_grid_col_width_minus1 | u(v) |
|     subpic_grid_row_height_minus1 | u(v) |
|     for( i = 0; i < NumSubPicGridRows; i++ ) | |
|       for( j = 0; j < NumSubPicGridCols; j++ ) | |
|         subpic_grid_idx[ i ][ j ] | u(v) |
|     for( i = 0; i <= NumSubPics; i++ ) { | |
|       subpic_treated_as_pic flag[ i ] | u(1) |
|       loop_filter_across_subpic_enabled_flag[ i ] | u(1) |
|     } | |
|   } | |
|   bit_depth_luma_minus8 | ue(v) |
|   bit_depth_chroma_minus8 | ue(v) |
|   min_qp_prime_ts_minus4 | ue(v) |
|   sps_weighted_pred_flag | u(1) |
|   sps_weighted_bipred_flag | u(1) |
|   log2_max_pic_order_cnt_lsb_minus4 | ue(v) |
|   if( sps_max_sub_layers_minus1 > 0 ) | |
|     sps_sub_layer_ordering_info_present_flag | u(1) |
|   for( i = ( sps_sub_layer_ordering_info_present_flag ? 0 : sps_max_sub_layers_minus1 ); | |
|     i <= sps_max_sub_layers_minus1; i++ ) { | |
|     sps_max_dec_pic_buffering_minus1[ i ] | ue(v) |
|     sps_max_num_reorder_pics[ i ] | ue(v) |
|     sps_max_latency_increase_plus1[ i ] | ue(v) |
|   } | |
|   long_term_ref_pics_flag | u(1) |
|   inter_layer_ref_pics_present_flag | u(1) |
|   sps_idr_rpl_present flag | u(1) |
|   ... | |
|   rpl1_same_as_rpl0_flag | u(1) |
|   for( i = 0; i < !rpl1_same_as_rpl0_flag ? 2 : 1; i++ ) { | |
|     num_ref_pic_lists_in_sps[ i ] | ue(v) |
|     for( j = 0; j < num_ref_pic_lists_in_sps[ i ]; j++ ) | |
|       ref_pic_list_struct( i, j ) | |
|   } | |
| ... | |

And the value of delta POC (the variable AbsDeltaPocSt) is conditionally restored at the decoder side as follows. abs_delta_poc_st[listIdx][rplsIdx][i] specifies the value of the variable AbsDeltaPocSt[listIdx][rplsIdx][i] as follows.

```
if (sps_weighted_pred_flag || sps_weighted_bipred_flag)
    AbsDeltaPocSt[ listIdx ][ rplsIdx ][ i ]    =
    abs_delta_poc_st[ listIdx ][ rplsIdx ][ i ]
else
    AbsDeltaPocSt[ listIdx ][ rplsIdx ][ i ] =
    abs_delta_poc_st[ listIdx ][ rplsIdx ][ i ] + 1
```

Figure 6:
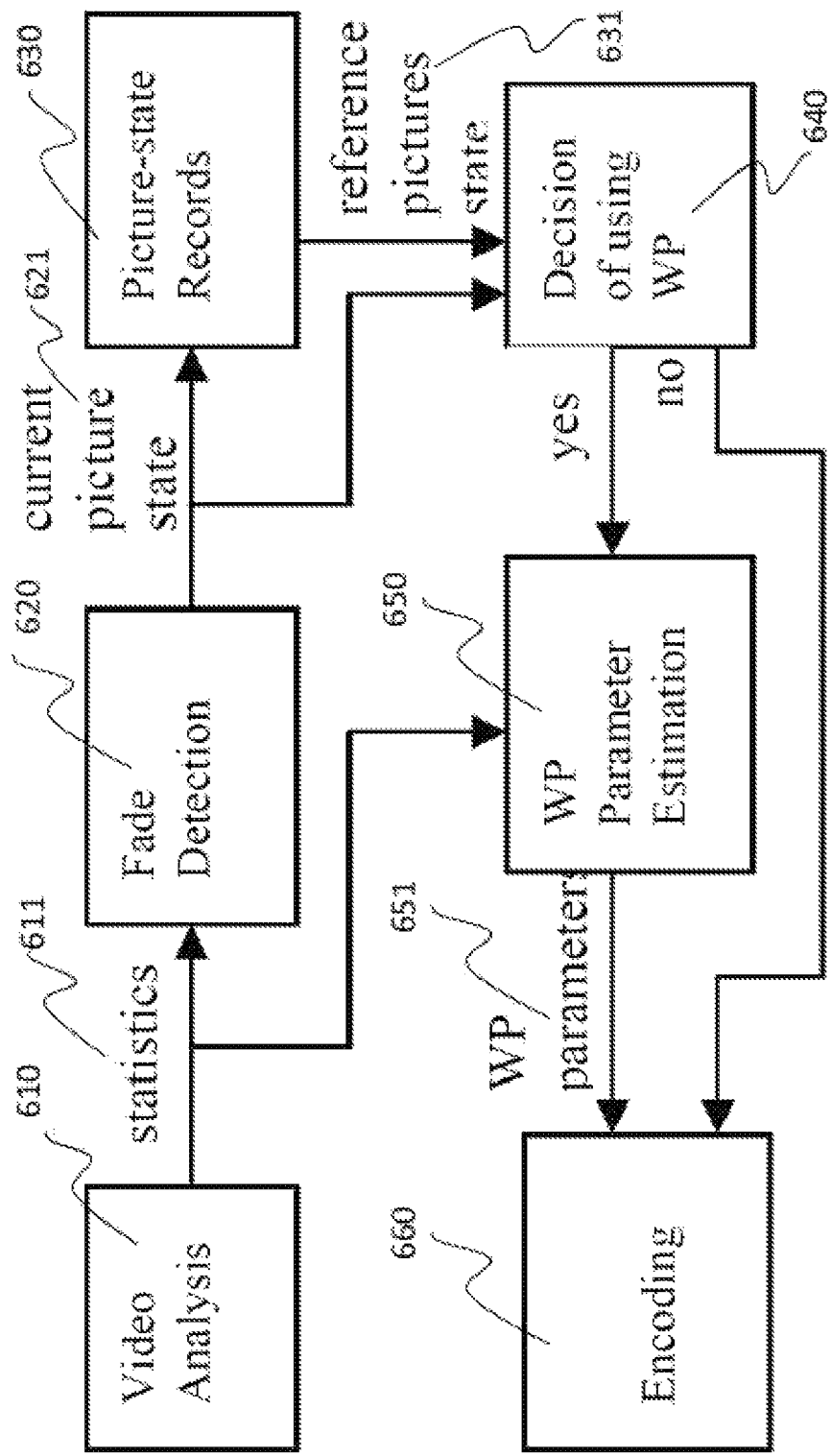
FIG. 6 is a flowchart for weighted prediction encoder-side decision making and parameter estimation.
Figure 9:
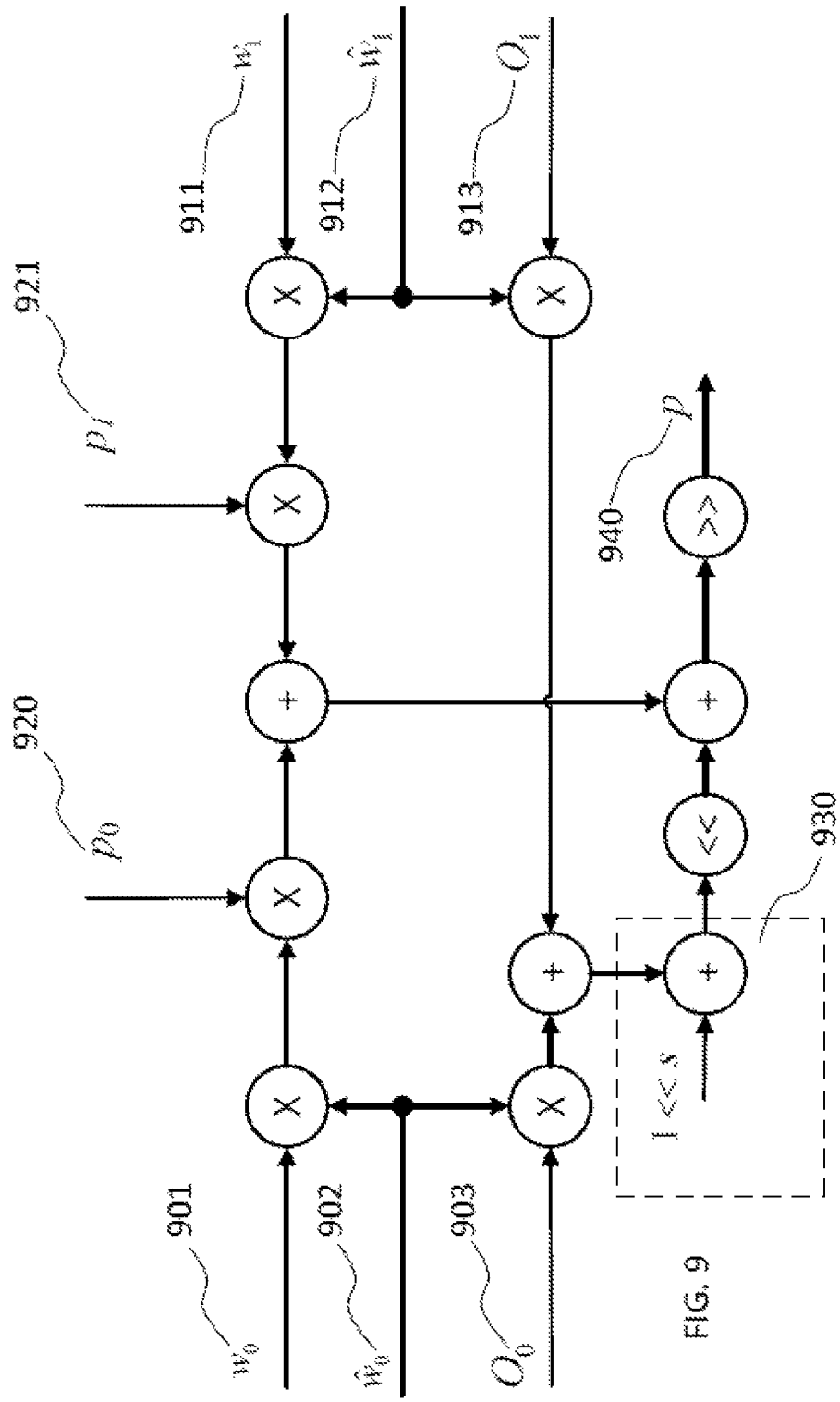
FIG. 9 is a flowchart showing an embodiment of the proposed method where final weights applied to prediction blocks are computed on the fly.

TPM and GEO are partitioning techniques that enable non-horizontal and non-vertical boundaries between prediction partitions, as exemplarily shown in FIG. 6, where prediction unit PU1 601 and prediction unit PU1 602 are combined in region 603 using a weighted averaging procedure of subsets of their samples related to different color components. TMP enables boundaries between prediction partitions only along a rectangular block diagonals, whereas boundaries according to GEO may be located at arbitrary positions as FIG. 9 illustrates. In region 603 of FIG. 6, integer numbers within squares denote weights WPU1 applied to luma component of prediction unit PU1. In an example, weights WPU2 applied to luma component of prediction unit PU2 are calculated as WPU2=8 WPU1.

Weights applied to chroma components of corresponding prediction units may differ from weights applied to luma components of corresponding prediction units.

The details on the syntax for TPM are presented in Table 1, where 4 syntax elements are used to signal information on TPM such as, e.g., MergeTriangleFlag is a flag that identifies whether TPM is selected or not ("0" means that TPM is not selected; otherwise, TPM is chosen); merge_triangle_split_dir is a split direction flag for TPM ("0" means the split direction from top-left corner to the below-right corner; otherwise, the split direction is from top-right corner to the below-left corner); merge_triangle_idx0 and merge_triangle_idx1 are indices of merge candidates 0 and 1 used for TPM.

Increasing compression efficiency of TPM and GEO by reducing bi-rate needed to encode blocks, the blocks are predicted using these and similar partitioning techniques.

Prediction errors are localized only in near-boundary region that covers the boundary between partitions that to use a more compact representation. Transform and quantization are performed only for this near-boundary region.

Figure 7:
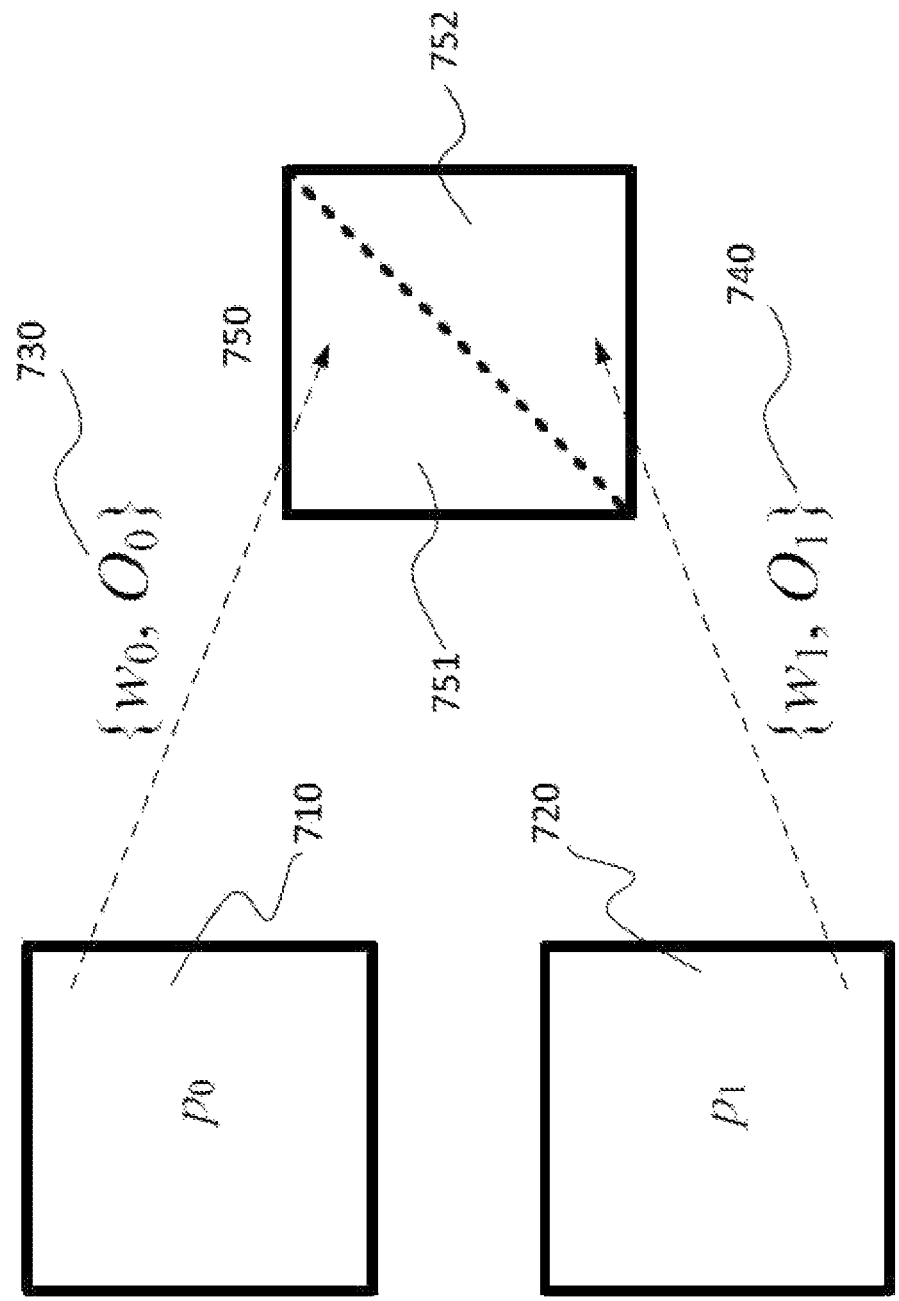
FIG. 7 is a diagram illustrating the proposed method applied to an inter-predicted block where TPM is selected.
Figure 8:
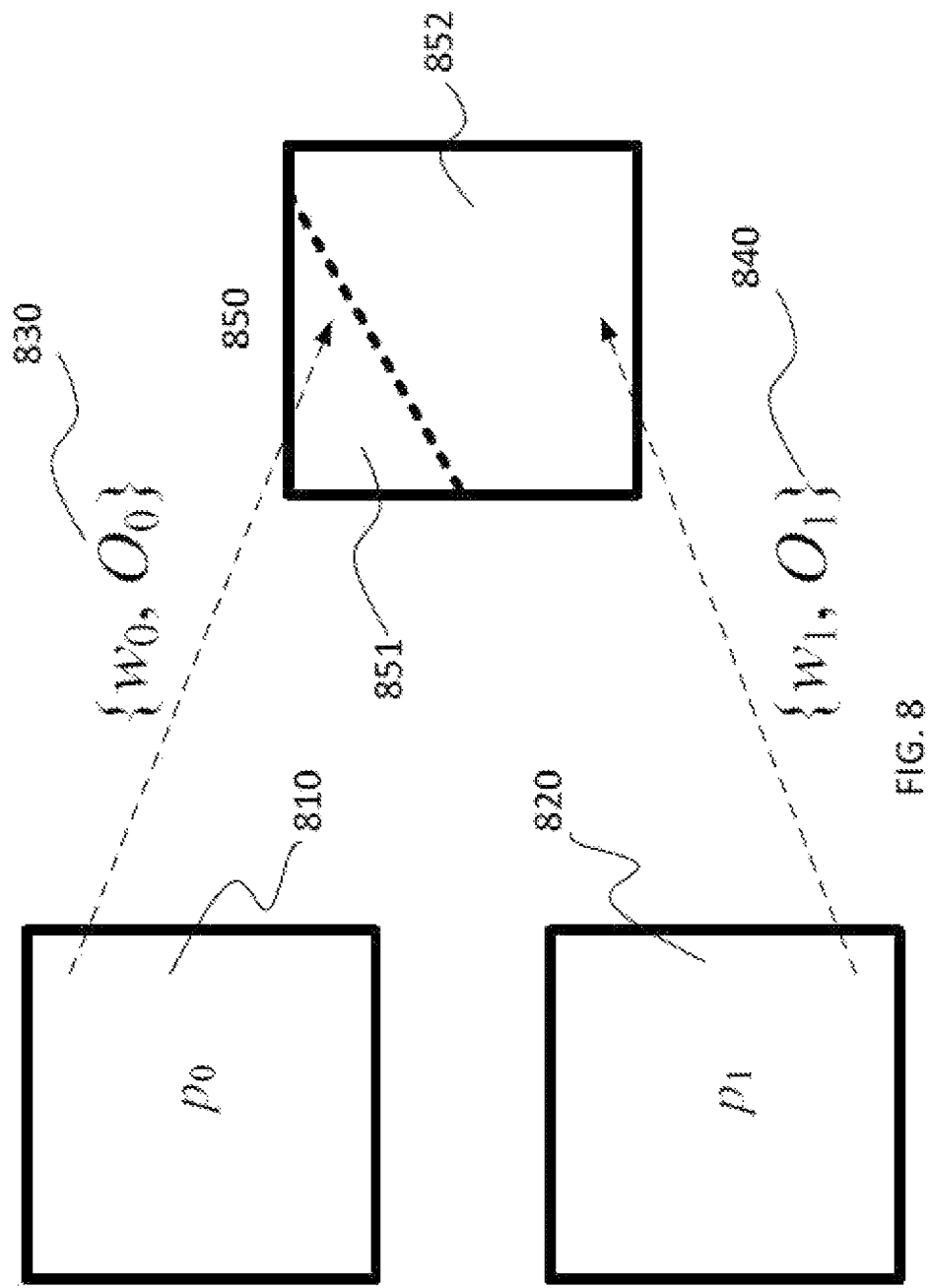
FIG. 8 is a diagram illustrating of the proposed method applied to an inter-predicted block where GEO is selected.

FIG. 7 and FIG. 8 illustrate the basic idea behind the given disclosure for TPM and GEO, respectively. In the case of TPM, each inter-predictor P0 710 and P1 720 are weighted for block 750 in accordance with the WP parameters (WP parameters 730 {w0, O0} and WP parameters 740 {w1, O1} for P0 and P1, respectively) defined for each picture in the reference picture list. Similarly, each inter-predictor P0 710

TABLE 1

Merge data syntax including syntax for TPM

| | Descriptor |
|---|---|
| merge_data( x0, y0, cbWidth, cbHeight ) { | |
|   if( CuPredMode[ x0 ][ y0 ] = = MODE_IBC ) { | |
|     if( MaxNumMergeCand > 1 ) | |
|       merge_idx[ x0 ][ y0 ] | ae(v) |
|   } else { | |
|     if( sps_mmvd_enabled_flag_l1_cbWidth * cbHeight != 32 ) | |
|       regular_merge_flag[ x0 ][ y0 ] | ae(v) |
|     if( regular_merge_flag[ x0 ][ y0 ] = = 1 ){ | |
|       if( MaxNumMergeCand > 1 ) | |
|         merge_idx[ x0 ][ y0 ] | ae(v) |
|     } else { | |
|       if( sps_mmvd_enabled_flag && cbWidth * cbHeight != 32 ) | |
|         mmvd_merge_flag[ x0 ][ y0 ] | ae(v) |
|       if( mmvd_merge_flag[ x0 ][ y0 ] = = 1 ) { | |
|         if( MaxNumMergeCand > 1 ) | |
|           mmvd_cand_flag[ x0 ][ y0 ] | ae(v) |
|         mmvd_distance_idx[ x0 ][ y0 ] | ae(v) |
|         mmvd_direction_idx[ x0 ][ y0 ] | ae(v) |
|       } else { | |
|         if( MaxNumSubblockMergeCand > 0 && cbWidth >= 8 && cbHeight >= 8 ) | |
|           merge_subblock_flag[ x0 ][ y0 ] | ae(v) |
|         if( merge_subblock_flag[ x0 ][ y0 ] = = 1 ) { | |
|           if( MaxNumSubblockMergeCand > 1 ) | |
|             merge_subblock_idx[ x0 ][ y0 ] | ae(v) |
|         } else { | |
|           if( sps_cup_enabled_flag && cu_skip_flag[ x0 ][ y0 ] = = 0 && | |
|           ( cbWidth * cbHeight ) >= 64 && cbWidth < 128 && cbHeight < 128 ) { | |
|             ciip_flag[ x0 ][ y0 ] | ae(v) |
|           if( ciip_flag[ x0 ][ y0 ] && MaxNumMergeCand > 1 ) | |
|             merge_idx[ x0 ][ y0 ] | ae(v) |
|           } | |
|           if( MergeTriangleFlag[ x0 ][ y0 ] ) { | |
|             merge_triangle_split_dir[ x0 ][ y0 ] | ae(v) |
|             merge_triangle_idx0[ x0 ][ y0 ] | ae(v) |
|             merge_triangle_idx1[ x0 ][ y0 ] | ae(v) |
|           } | |
|         } | |
|       } | |
|     } | |
|   } | |
| } | |

In more detail, TPM is described in the following proposal: R-L. Liao and C. S. Lim "CE10.3.1.b: Triangular prediction unit mode," contribution JVET-L0124 to the 12th JVET meeting, Macao, China, October 2018. GEO is explained in the following paper: M. Blaser, J. Schneider, Johannes Sauer, and Mathias Wien, "Geometry-based Partitioning for Predictive Video Coding with Transform Adaptation," Picture Coding Symposium (PCS), San Francisco, California, USA, June 2018.

and P1 720 are weighted for block in accordance with the WP parameters (WP parameters 730 {w0, O0} and WP parameters 740 {w1, O1} for P0 and P1, respectively) defined for each picture in the reference picture list.

For a rectangular block predicted using bi-prediction mechanism, the following process may be performed as described below.

Inputs to this process may be as follows. Two variables nCbW and nCbH specifying the width and the height of the current coding block, two (nCbW)×(nCbH) arrays predSamplesL0 and predSamplesL1, the prediction list utilization flags, predFlagL0 and predFlagL1, the reference indices, refIdxL0 and refIdxL1, the variable cIdx specifying the colour component index, the sample bit depth, bitDepth. Output of this process is the (nCbW)×(nCbH) array pbSamples of prediction sample values. The variable shift1 is set equal to Max(2, 14−bitDepth).

The variables log2Wd, o0, o1, w0 and w1 are derived as follows.

If cIdx is equal to 0 for luma samples, the following applies.

$$log2Wd = \text{luma\_log2\_weight\_denom} + shift1$$

$$w0 = LumaWeightL0[refIdxL0]$$

$$w1 = LumaWeightL1[refIdxL1]$$

$$o0 = \text{luma\_offset\_l0}[refIdxL0] << (BitDepthY - 8) o1 =$$

$$\text{luma\_offset\_l1}[refIdxL1] << (BitDepthY - 8)$$

Otherwise (cIdx is not equal to 0 for chroma samples), the following applies.

$$log2Wd = ChromaLog2WeightDenom + shift1$$

$$w0 = ChromaWeightL0\,[refIdxL0]\,[cIdx - 1]$$

$$w1 = ChromaWeightL1\,[refIdxL1]\,[cIdx - 1]$$

$$o0 = ChromaOffsetL0[refIdxL0]\,[cIdx - 1] << (BitDepthC - 8)$$

$$o1 = ChromaOffsetL1[refIdxL1][cIdx - 1] << (BitDepthC - 8)$$

The prediction sample pbSamples[x][y] with x=0 . . . nCbW−1 and y=0 . . . nCbH−1 are derived as follows.

If predFlagL0 is equal to 1 and predFlagL1 is equal to 0, the prediction sample values are derived as follows

```
if( log2Wd >= 1)
  pbSamples[ x ][ y ] = Clip3( 0, ( 1 << bitDepth ) − 1,
  ((predSamplesL0[x][y]*w0 + 2log2Wd − 1 ) >> log2Wd) + o0)
else
  pbSamples[x][y] = Clip3(0,( 1 << bitDepth ) − 1,
  predSamplesL0[x][y]*w0 + o0)
```

Otherwise, if predFlagL0 is equal to 0 and predFlagL1 is equal to 1, the prediction sample values are derived as follows.

```
if( log2Wd >= 1)
pbSamples[ x ][ y ] = Clip3( 0, ( 1 << bitDepth ) − 1,
( ( predSamplesL1[ x ][ y ] * w1 + 2log2Wd − 1) >> log2Wd ) + o1 )
else
pbSamples[ x ][ y ] = Clip3( 0, ( 1 << bitDepth ) − 1,
predSamplesL1[ x ][ y ] * w1 + o1 )
```

Otherwise (predFlagL0 is equal to 1 and predFlagL1 is equal to 1), the prediction sample values are derived as follows.

$$pbSamples[x][y] = Clip3(0, (1 << bitDepth) - 1,$$
$$(predSamplesL0[x][y]*w0 + predSamplesL1[x][y]*w1 +$$
$$((o0 + o1 + 1) << log2Wd)) >> (log2Wd + 1))$$

Parameters of the slice-level weighted prediction could be represented as a set of variables, assigned for each element of a reference picture list. Index of the element is denoted further as "i". These parameters may comprise the following.

LumaWeightL0[i]
  luma_offset_0[i] is the additive offset applied to the luma prediction value for list 0 prediction using RefPicList [0][i]. The value of luma_offset_0[i] shall be in the range of 128 to 127, inclusive. When luma_weight_l0_flag[i] is equal to 0, luma_offset_0[i] is inferred to be equal to 0.

The variable LumaWeightL0[i] is derived to be equal to (1<<luma_log2_weight_denom)+delta_luma_weight_l0[i]. When luma_weight_l0_flag[i] is equal to 1, the value of delta_luma_weight_l0[i] shall be in the range of −128 to 127, inclusive. When luma_weight_l0_flag[i] is equal to 0, LumaWeightL0[i] is inferred to be equal to 2luma_log2_weight_denom.

For a rectangular block predicted using bi-prediction mechanism, the following process is performed as described below.

Inputs to this process are the following. Two variables nCbW and nCbH specifying the width and the height of the current coding block, two (nCbW)×(nCbH) arrays predSamplesLA and predSamplesLB, a variable triangleDir specifying the partition direction, a variable cIdx specifying colour component index. Output of this process is the (nCbW)×(nCbH) array pbSamples of prediction sample values.

The variable nCbR is derived as follows.

$$nCbR = (nCbW > nCbH) \,?\, (nCbW/nCbH) : (nCbH/nCbW)$$

The variable bitDepth is derived as follows.
If cIdx is equal to 0, bitDepth is set equal to BitDepthY.
Otherwise, bitDepth is set equal to BitDepthC.
Variables shift1 and offset1 are derived as follows.
The variable shift1 is set equal to Max(5, 17−bitDepth).
The variable offset1 is set equal to 1<<(shift1−1).
Depending on the values of triangleDir, wS and cIdx, the prediction samples pbSamples[x][y] with x=0 . . . nCbW−1 and y=0 . . . nCbH−1 are derived as follows.
The variable wIdx is derived as follows.
If cIdx is equal to 0 and triangleDir is equal to 0, the following applies.

$$wIdx = (nCbW > nCbH) \,?\, (Clip3(0, 8, (x/nCbR - y) + 4)):$$
$$(Clip3(0, 8, (x - y/nCbR) + 4))$$

Otherwise, if cIdx is equal to 0 and triangleDir is equal to 1, the following applies.

$$wIdx = (nCbW > nCbH) \: ? (Clip3(0, 8, (nCbH - 1 - x/nCbR - y) + 4))$$
$$(Clip3(0, 8, (nCbW - 1 - x - y/nCbR) + 4))$$

Otherwise, if cIdx is greater than 0 and triangleDir is equal to 0, the following applies.

$$wIdx = (nCbW > nCbH) \: ? \: (Clip3(0, 4, (x/nCbR - y) + 2)):$$
$$(Clip3(0, 4, (x - y/nCbR) + 2))$$

Otherwise (if cIdx is greater than 0 and triangleDir is equal to 1), the following applies.

$$wIdx = (nCbW > nCbH) \: ? \: (Clip3(0, 4, (nCbH - 1 - x/nCbR - y) + 2))$$
$$(Clip3(0, 4, (nCbW - 1 - x - y/nCbR) + 2))$$

The variable wValue specifying the weight of the prediction sample is derived using wIdx and cIdx as follows.

$$wValue = (cIdx == 0) \: ? \: Clip3(0, 8, wIdx) : Clip3(0, 8, wIdx * 2)$$

The prediction sample values are derived as follows.

$$pbSamples[x][y] =$$
$$Clip3(0, (1 << bitDepth) - 1, (predSamplesLA[x][y] * wValue +$$
$$predSamplesLB[x][y] * (8 - wValue) + offset1) >> shift1)$$

Figure 10:
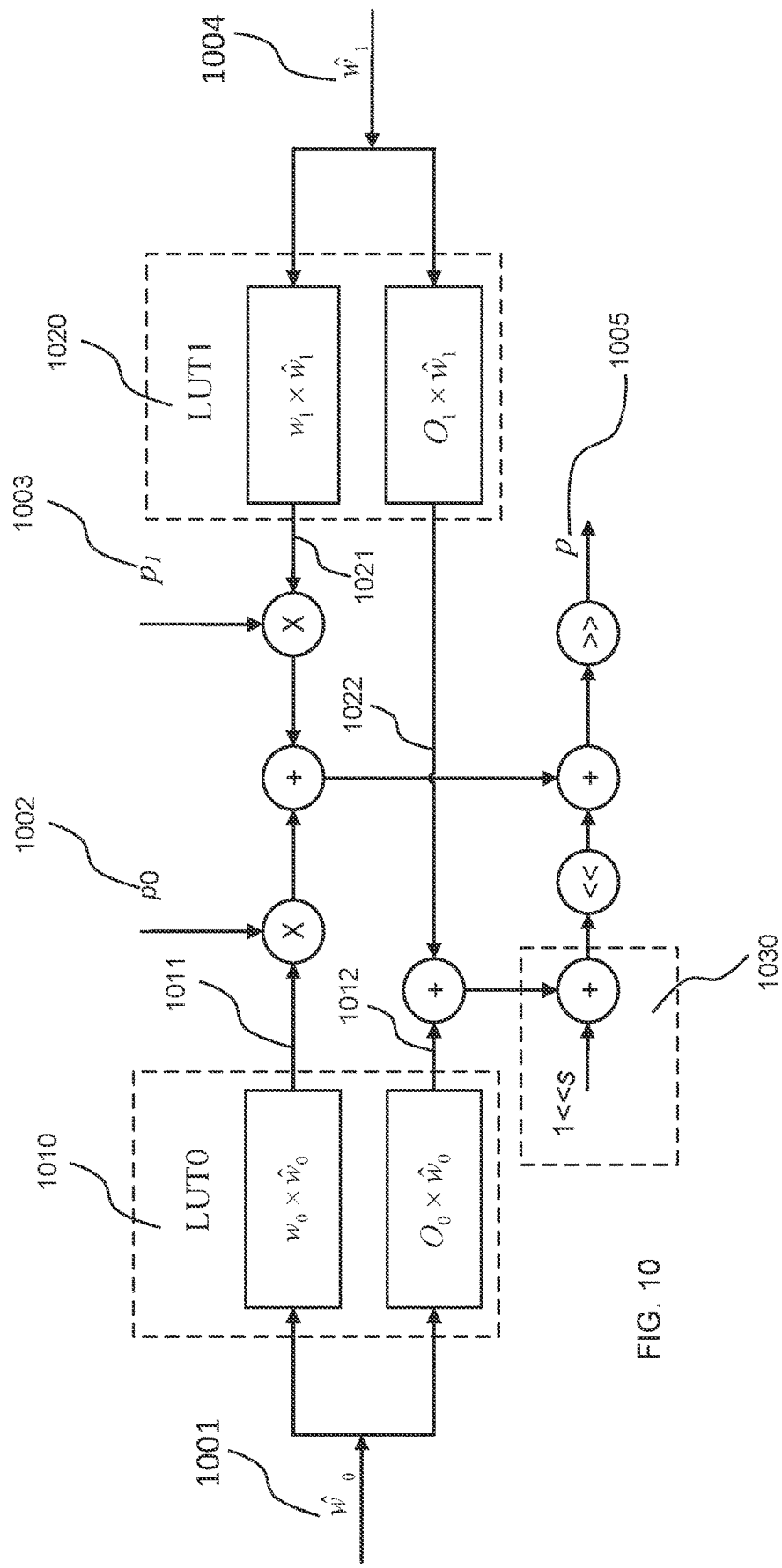
FIG. 10 is a flowchart showing an embodiment of the proposed method where final weights applied to prediction blocks are pre-calculated and stored into look-up tables.

The present disclosure discloses a method of a weighted sample prediction process that combines two weighting processes (see FIG. 9 and FIG. 10). Both weighting processes obtain predicted samples using a linear combination of samples belonging to two uni-predicted reference blocks, wherein a predicted sample (940, 1005) in a predicted block having a position defined as (x,y) relative to the top-left corner of the predicted block may derived using a linear combination of two samples, each of these samples have a position (x,y) correspondingly relative to the top-left corners of their reference blocks.

In the first weighting process, weights applied to the two samples being of the reference blocks do not depend on the position (x,y) of a predicted sample (also referred to as the to-be-predicted sample) within a predicted block (also referred to as the to-be-predicted block). These weights may be also referred to as a first set of linear combination parameters. This first set of linear combination parameters may comprise at least one parameter.

For example, BCW or slice-level weighted prediction may be provided or used. For the BCW method, weights of the linear combination are assigned per-block. For slice-level weighted prediction, each element of the reference picture list that is signalled on the slice level may have a pair of weight and offset assigned for the referenced picture. There may also only be a weight or an offset provided, or the weight or the offset may be zero, respectively. In this case, a block determines weights and offsets for the linear combination with respect to the pair of reference indices that indicate a pair of reference picture list elements, and hence, a set of parameters for linear combination (including weights and offsets). Hence, predicted sample f is determined as follows.

$$f =$$
$$((p_0 \times w_0 + p_1 \times w_1 + 2^{log_2 WD}) \gg (log_2 WD + 1)) + ((O_0 + O_1 + 1) \gg 1),$$

wherein pi (920, 921, 1002, 1003) is a sample of a reference block i, {wi, Oi} (901, 903 and 911, 913) are weight (wi) and offset (Oi) specified for an element of ith reference picture list, parameter WD is the bit depth of weights wi, that is required for the normalization of the result of weighting process. In a particular implementation, WD could be set equal to 6 or 7.

In the second weighting process, weights applied to the two samples being of the reference blocks depend on the position (x,y) of a predicted sample within a predicted block. These weights may be referred to as second set of linear combination parameters. This second set of linear combination parameters may comprise at least one parameter where the value of the parameter (the weight, respectively) depends on the position of the predicted sample (i.e. the to-be-predicted sample) within the predicted block (i.e. the to-be-predicted block). In particular, for the triangle merge mode (also referred to as TPM, triangle partitioning module), predicted sample p is determined as $p=(p_0 \times \hat{w}_0 + p_1 \times \hat{w}_1) \gg s$, wherein the sum of weights $\{\hat{w}_0, \hat{w}_1\}$ (902, 912) is constant, i.e. $\hat{w}_1 = (1 \ll s) - \hat{w}_0$, and the weights' values are normalized to the weight bitdepth s. In a particular implementation s=3.

In a particular embodiment, weighting operation may comprise rounding step $$p = (p_0 \times \hat{w}_0 + p_1 \times \hat{w}_1 + (1 << (s - 1))) >> s$$

Both weighting processes could be combined in a single one, thus obtaining a predicted sample as follows.

$$p = (p_0 \times w_0 \times \hat{w}_0 + p_1 \times w_1 \times \hat{w}_1 +$$
$$(O_0 \times \hat{w}_0 + O_1 \times \hat{w}_1 + (1 \ll s)) \times 2^{log_2 WD}) \gg (s + log_2 WD)$$

In another embodiment, the term (1<<s) may be skipped as follows.

$$p = (p_0 \times w_0 \times \hat{w}_0 + p_1 \times w_1 \times \hat{w}_1 + (O_0 \times \hat{w}_0 + O_1 \times \hat{w}_1) \times 2^{log_2 WD}) \gg$$
$$(s + log_2 WD)$$

The disclosure may be described as a process of restoration of a triangle merge mode with the slice-level weighted prediction parameters.

Inputs to this process may exemplarily be two variables nCbW and nCbH specifying the width and the height of the current coding block, two (nCbW)×(nCbH) arrays pred- SamplesLA and predSamplesLB, a variable triangleDir specifying the partition direction, a variable cIdx specifying colour component index.

Output of this process is the (nCbW)×(nCbH) array pbSamples of prediction sample values.

The variable nCbR is derived as follows.

$$nCbR = (nCbW > nCbH) \ ? \ (nCbW/nCbH) : (nCbH/nCbW)$$

The variable bitDepth is derived as follows.

If cIdx is equal to 0, bitDepth is set equal to BitDepthY.

Otherwise, bitDepth is set equal to BitDepthC.

Variables shift1 and offset1 are derived as follows.

The variable shift1 is set equal to Max(5, 17−bitDepth).

The variable offset1 is set equal to 1<<(shift1−1).

Depending on the values of triangleDir, wS and cIdx, the prediction samples pbSamples[x][y] with x=0 . . . nCbW−1 and y=0 . . . nCbH−1 are derived as follows.

The variable wIdx is derived as follows.

If cIdx is equal to 0 and triangleDir is equal to 0, the following applies.

$$wIdx = (nCbW > nCbH) \ ? \ (Clip3(0, 8, (x/nCbR - y) + 4)) :$$
$$(Clip3(0, 8, (x - y/nCbR) + 4))$$

Otherwise, if cIdx is equal to 0 and triangleDir is equal to 1, the following applies.

$$wIdx = (nCbW > nCbH) \ ? \ (Clip3(0, 8, (nCbH - 1 - x/nCbR - y) + 4))$$
$$(Clip3(0, 8, (nCbW - 1 - x - y/nCbR) + 4))$$

Otherwise, if cIdx is greater than 0 and triangleDir is equal to 0, the following applies.

$$wIdx = (nCbW > nCbH) \ ? \ (Clip3(0, 4, (x/nCbR - y) + 2)) :$$
$$(Clip3(0, 4, (x - y/nCbR) + 2))$$

Otherwise (if cIdx is greater than 0 and triangleDir is equal to 1), the following applies.

$$wIdx = (nCbW > nCbH) \ ? \ (Clip3(0, 4, (nCbH - 1 - x/nCbR - y) + 2))$$
$$(Clip3(0, 4, (nCbW - 1 - x - y/nCbR) + 2))$$

The variable wValue specifying the weight of the prediction sample is derived using wIdx and cIdx as follows.

$$wValue = (cIdx == 0) \ ? \ Clip3(0, 8, CwIdx) : Clip3(0, 8, wIdx*2)$$

The value w0 is defined as follows

If cIdx is equal to 0 for luma samples, the following applies.

$$log2Wd = luma\_log2\_weight\_denom + shift1$$

$$w0 = (triangleDir == 0) \ ? \ LumaWeightL$$

$$0[refIdxL0]:$$

$$LumaWeightL1[refIdxL1] w1 = (triangleDir == 0) \ ?$$

$$LumaWeightL1[refIdxL1] : LumaWeightL0[refIdxL0]$$

$$o0 = (triangleDir == 0) \ ? \ luma\_offset\_l0[refIdxL0]:$$

$$luma\_offset\_l1[refIdxL1] << (BitDepthY - 8)$$

$$o1 = (triangleDir == 0) \ ? \ luma\_offset\_l1[refIdxL1]:$$

$$luma\_offset\_l0[refIdxL0] << (BitDepthY - 8)$$

Otherwise (cIdx is not equal to 0 for chroma samples), the following applies.

$$log2Wd = ChromaLog2WeightDemon + shift1$$

$$cIdxM1 = cIdx - 1$$

$$w0 = (triangleDir == 0) \ ? \ ChromaWeightL0[refIdxL0][cIdxM1]:$$

$$ChromaWeightL1[refIdxL1][cIdxM1]$$

$$w1 = (triangleDir == 0) \ ? \ ChromaWeightL1[refIdxL1][cIdxM1]:$$

$$ChromaWeightL0[refIdxL0][cIdxM1]$$

$$o0 = ((triangleDir == 0) \ ? \ ChromaOffsetL0[refIdxL0]:$$

$$ChromaOffsetL1[refIdxL1])$$

$$o1 = ((triangleDir == 0) \ ? \ ChromaOffsetL1[refIdxL1]:$$

$$ChromaOffsetL0[refIdxL0])$$

$$o0 = o2 << (BitDepthC - 8)$$

$$o0 = o1 << (BitDepthC - 8)$$

The offset value is derived as follows.

$$offsetBi = (((triangleDir == 0) \ ? \ o1 : o0) * wValue +$$
$$((triangleDir == 0) \ ? \ o0 : o1) * (8 - wValue))$$

$$offsetBi = offsetBi >> (3 - 1)$$

The joint weight wBi0 is derived as follows.

$$wBi0 = (triangleDir == 0) \ ? \ w1 : w0) * wValue$$

$$wBi1 = (triangleDir == 0) \ ? \ w0 : w1) * (8 - wValue)$$

The prediction sample values are derived as follows.

$$pbSamples[x][y] = Clip3(0, (1 << bitDepth) - 1,$$
$$(predSamplesL0[x][y] * wBi0 +$$
$$predSamplesL1[x][y] * wBi1 + offsetBi) >> (3 + log2Wd + 1))$$

According to the steps of the disclosure, combined linear combination parameters are obtained, by combining the parameters of the first set of linear combination parameters and the second set of linear combination parameters as referred to above. The combined linear combination parameters, in one embodiment, are obtained by combining at least one parameter of the first set of linear combination parameters and at least one parameter of the second set of linear combination parameters.

In the above notation, this means that, for example, a combined linear combination parameter is obtained by $w_{0i} = w_i \times \hat{w}_i$ for all values i. It is noted that the value $w_{0i}$ is not normalized, in some embodiments. In the above notation and in the preceding equation, the values with a "^" (hat) are position-dependent parameters while the values without a hat are position-independent parameters.

By using the grouping of parameters before calculating the to-be-predicted sample, the number of multiplications can be reduced.

In the exemplary implementation above, these parameters are wBi0, wBi1, offsetBi and (3+log2Wd+1). It is understood, that the value "3" is in fact a weight bitdepth parameter of the set of parameters that do not depend on the position of the predicted samples.

In another embodiment of the disclosure, combined linear combination parameters are precalculated per each of the allowed values of position-dependent linear combination parameters. In an example, {wBi0[wValue], wBi1[wValue], offsetBi[wValue]} could be precalculated and stored per each element of the reference picture list.

As shown in FIG. 10, combined linear combination parameters can be fetched from a provided look-up table, LUT, using a corresponding wValue instead of recalculating these values per each predicted sample.

In one embodiment, the or at least one of the parameters of the first set of linear combination parameters are provided in a slice-header as mentioned above. The or at least one of the parameters of the second set of linear combination parameters may then be provided in a look-up table.

In order to implement, in one embodiment, the disclosure also in VVC, an alternative formulation of VVC may be partially used.

Alternative VVC specification draft may be defined as follows.

Inputs to this process may be two variables nCbW and nCbH specifying the width and the height of the current coding block, two (nCbW)×(nCbH) arrays predSamplesLA and predSamplesLB, a variable triangleDir specifying the partition direction, a variable cIdx specifying colour component index. Output of this process is the (nCbW)×(nCbH) array pbSamples of prediction sample values.

The variable nCbR is derived as follows.

$$nCbR = (nCbW < nCbH) ? (nCbW / nCbH) : (nCbH / nCbW)$$

The variable bitDepth is derived as follows.
If cIdx is equal to 0, bitDepth is set equal to BitDepthY.
Otherwise, bitDepth is set equal to BitDepthC.
Variables shift1 and offset1 are derived as follows.
The variable shift1 is set equal to Max(5, 17−bitDepth).
The variable offset1 is set equal to 1<<(shift1−1).
Depending on the values of triangleDir, wS and cIdx, the prediction samples pbSamples[x][y] with x=0 . . . nCbW−1 and y=0 . . . nCbH−1 are derived as follows.
The variable wIdx is derived as follows.
If cIdx is equal to 0 and triangleDir is equal to 0, the following applies.

$$wIdx = (nCbW > nCbH)?(Clip3(0, 8, (x/nCbR - y) + 4)):$$
$$(Clip3(0, 8, (x - y/nCbR) + 4))$$

Otherwise, if cIdx is equal to 0 and triangleDir is equal to 1, the following applies.

$$wIdx = (nCbW > nCbH) ? (Clip3(0, 8, (nCbH - 1 - x/nCbR - y) + 4))$$
$$(Clip3(0, 8, (nCbW - 1 - x - y/nCbR) + 4))$$

Otherwise, if cIdx is greater than 0 and triangleDir is equal to 0, the following applies.

$$wIdx = (nCbW > nCbH) ? (Clip3(0, 4, (x/nCbR - y) + 2)):$$
$$(Clip3(0, 4, x - y/nCbR) + 2))$$

Otherwise (if cIdx is greater than 0 and triangleDir is equal to 1), the following applies.

$$wIdx = (nCbW > nCbH) ? (Clip3(0, 4, (nCbH - 1 - x/nCbR - y) + 2))$$
$$(Clip3(0, 4, (nCbW - 1 - x - y/nCbR) + 2))$$

The variable wValue specifying the weight of the prediction sample is derived using wIdx and cIdx as follows.

$$wValue = (cIdx == 0) ? Clip3(0, 8, wIdx) : Clip3(0, 8, wIdx * 2)$$

The value w0 is defined as follows.
If cIdx is equal to 0 for luma samples, the following applies.

$$log2Wd = luma\_log2\_weight\_denom + shift1$$
$$w0 = (triangleDir == 0) ? LumaWeightL$$
$$0[refIdxL0]:$$
$$LumaWeightL1[refIdxL1]w1 = (triangleDir == 0) ?$$
$$LumaWeightL1[refIdxL1] : LumaWeightL0[refIdxL0]$$

-continued $o0 = (triangleDir == 0)$ ? luma_offset_l0[refIdxL0] :

luma_offset_l1[refIdxL1]<< (BitDepthY − 8)

$o1 = (triangleDir == 0)$ ? luma_offset_l1[refIdxL1] :

luma_offset_l0[refIdxL0]<< (BitDepthY − 8)

Otherwise (cIdx is not equal to 0 for chroma samples), the following applies.

```
log2Wd = ChromaLog2WeightDenom + shift1
cIdxM1 = cIdx-1
w0  =  (triangleDir  ==0)  ?  ChromaWeightL0[ refIdxL0 ]
[cIdxM1]:
ChromaWeightL1[ refIdxL1 ] [ cIdxM1]
w1  =  (triangleDir  ==0)  ?  ChromaWeightL1[ refIdxL1 ]
[cIdxM1]:
ChromaWeightL0[ refIdxL0 ] [ cIdxM1]
o0 = ((triangleDir ==0) ? ChromaOffsetL0 [ refIdxL0 ] :
ChromaOffsetL1 [ refIdxL1 ] )
o1 = ((triangleDir ==0) ? ChromaOffsetL1 [refIdxL1 ] :
ChromaOffsetL0 [ refIdxL0 ] )
o0 = o0 << ( BitDepthC − 8 )
o0 = o1 << ( BitDepthC − 8 )
```

The offset value is derived as follows.

```
offsetBi = (((triangleDir ==0) ? o1 : o0)*wValue + ((triangleDir ==0) ?
o0 : o1)* (8-wValue))
offsetBi = offsetBi << log2WD
```

The joint weight wBi0 is derived as follows:

```
wBi0 = (triangleDir ==0) ? w1 : w0)*wValue
wBi1 = (triangleDir ==0) ? w0 : w1)*(8-wValue)
```

The prediction sample values are derived as follows.

```
pbSamples[ x ][ y ]  =  Clip3( 0, ( 1 << bitDepth ) − 1,
( predSamplesL0[ x ][ y ] * wBi0  +  predSamplesL1[ x ][ y ] *
wBi1  + offsetBi ) >> (3+ log2Wd + 1 ) )
```

In another alternative embodiment, a corresponding part of the VVC specification draft may be defined as follows.

Inputs to this process are two variables nCbW and nCbH specifying the width and the height of the current coding block, two (nCbW)×(nCbH) arrays predSamplesLA and predSamplesLB, a variable triangleDir specifying the partition direction, a variable cIdx specifying colour component index. Output of this process is the (nCbW)×(nCbH) array pbSamples of prediction sample values.

The variable nCbR is derived as follows.

```
nCbR = ( nCbW > nCbH ) ? ( nCbW / nCbH ) : ( nCbH / nCbW )
```

The variable bitDepth is derived as follows.
If cIdx is equal to 0, bitDepth is set equal to BitDepthY.
Otherwise, bitDepth is set equal to BitDepthC.
Variables shift1 and offset1 are derived as follows:
The variable shift1 is set equal to Max(5, 17−bitDepth).
The variable offset1 is set equal to 1<<(shift1−1).
Depending on the values of triangleDir, wS and cIdx, the prediction samples pbSamples[x][y] with x=0 . . . nCbW−1 and y=0 . . . nCbH−1 are derived as follows.
The variable wIdx is derived as follows:
If cIdx is equal to 0 and triangleDir is equal to 0, the following applies.

```
wIdx = ( nCbW > nCbH ) ? ( Clip3( 0, 8, ( x / nCbR − y ) +
4 ) ):
( Clip3( 0, 8, ( x − y / nCbR) + 4) )
```

Otherwise, if cIdx is equal to 0 and triangleDir is equal to 1, the following applies.

```
wIdx = ( nCbW > nCbH ) ? ( Clip3( 0, 8, ( nCbH − 1 − x / nCbR − y ) +
4 ) )
  ( Clip3( 0, 8, ( nCbW − 1 − x − y / nCbR ) + 4 ) )
```

Otherwise, if cIdx is greater than 0 and triangleDir is equal to 0, the following applies:

```
wIdx = ( nCbW > nCbH ) ? ( Clip3( 0, 4, ( x / nCbR − y ) + 2 ) ):
( Clip3( 0, 4, ( x − y / nCbR ) + 2 ) )
```

Otherwise (if cIdx is greater than 0 and triangleDir is equal to 1), the following applies.

```
wIdx = ( nCbW > nCbH ) ? ( Clip3( 0, 4, ( nCbH − 1 − x / nCbR − y) +
2 ) )
  ( Clip3( 0, 4, ( nCbW − 1 − x − y / nCbR ) + 2 ) )
```

The variable wValue specifying the weight of the prediction sample is derived using wIdx and cIdx as follows.

```
wValue = ( cIdx = = 0 ) ? Clip3( 0, 8, wIdx ) : Clip3( 0, 8, wIdx * 2 )
```

The value w0 is defined as follows
If cIdx is equal to 0 for luma samples, the following applies:

```
log2Wd = luma_log2_weight_denom + shift1
w0 = (triangleDir ==0) ? LumaWeightL0[ refIdxL0 ]  :
LumaWeightL1  [ refIdxL1 ]
w1 = (triangleDir ==0) ? LumaWeightL1[ refIdxL1 ] :
LumaWeightL0[ refIdxL0 ]
o0 = ((triangleDir ==0) ? luma_offset_l0[ refIdxL0 ] :
luma_offset_l1[ refIdxL1 ] ) << ( BitDepthY − 8 )
o1 = ((triangleDir ==0) ? luma_offset_l1[ refIdxL1 ] :
luma_offset_l0[ refIdxL0 ] ) <<( BitDepthY − 8 )
```

Otherwise (cIdx is not equal to 0 for chroma samples), the following applies.

```
log2Wd = ChromaLog2WeightDenom + shift1
cIdxM1= cIdx-1
w0  =  (triangleDir  ==0)  ?  ChromaWeightL0[ refIdxL0 ][cIdxM1]:
ChromaWeightL1[ refIdxL1 ] [ cIdxM1]
```

```
wl     =     (triangleDir    ==0)    ?    ChromaWeightLl[ refIdxL1 ][cIdxM1]:
ChromaWeightL0[ refIdxL0 ] [ cIdxM1]
  o0 = ((triangleDir ==0) ? ChromaOffsetL0 [ refIdxL0 ] : ChromaOffsetL1 [ refIdxL1 ] )
  o1 = ((triangleDir ==0) ? ChromaOffsetL1 [ refIdxL1 ] : ChromaOffsetL0 [ refIdxL0 ] )
  o0 = o0 << ( BitDepthC − 8 )
  o0 = o1 << ( BitDepthC − 8 )
```

The offset value is derived as follows:

```
offsetBi = (((triangleDir ==0) ? o1 : o0)*wValue +
  ((triangleDir ==0) ? o0 : o1)* (8−wValue))
  offsetBi = offsetBi >>1
```

The joint weight wBi0 is derived as follows:

```
wBi0 = (triangleDir ==0) ? w1 : w0)*wValue
wBi1 = (triangleDir ==0) ? w0 : w1)*(8−wValue)
```

The prediction sample values are derived as follows:

```
pbSamples[ x ][ y ] = Clip3( 0, ( 1 << bitDepth ) − 1,
  (( predSamplesL0[ x ][ y ] * wBi0 + predSamplesL1[ x ][ y] * wBi1 )
>>
  (3+ log2Wd + 1 ) ) + offsetBi )
```

In another embodiment, the values of multiplied weights $\{w_0 \times \hat{w}_0, w_1 \times \hat{w}_1\}$ (as mentioned above, these are combined linear combination parameters that may be pre-calculated or grouped together before applying them to one or more samples of the reference list when calculating the to-be-predicted sample) are right-shifted in order to maintain the dynamic range that is used for weighting in bi-prediction. As a result, normalized values of weights ($w_{Ni}$, i=0, 1) are used in bi-prediction $w_{Ni} = (w_i \times \hat{w}_i + (1 << (s-1))) >> s$ This makes the values of weights used in weighted bi-prediction coarser. However, bitdepth of per-sample multiplication operations is not increased, which is helpful for unification of inter bi-prediction mechanism. According to this normalization operation, predicted sample value is derived as follows: $p = (p_0 \times w_{N0} + p_1 \times w_{N1} + (O_0 \times \hat{w}_0 + O_1 \times \hat{w}_1) \times 2^{(log_2 WD)-s}) >> log_2 WD$ According to some embodiments, the steps to obtain the value of predicted sample from corresponding two samples of the two reference blocks are as follows.

In step 1, non-normalized values of weights are obtained from position-dependent weights by multiplying slice-level weight by corresponding position-dependent weight. In one embodiment, this means obtaining the values $w_{0i}$ from the original parameter(s) of the first set of linear combination parameters and the second set of linear combination parameters.

In step 2, the values of normalized weights $\{w_{Ni}\}$ may be obtained using right-shifting, for example as explained above. Depending on the embodiment, this right-shift operation may comprise rounding offset: $w_{Ni} = (w_i \times \hat{w}_i + (1 << (s-1)) >> s$, or it may not: $w_{Ni} = w_i \times \hat{w}_i >> s$.

In step 3, a predicted sample value (i.e. a to-be-predicted sample of a to-be-predicted block) may be obtained as a linear combination of two samples (In an example, samples of at least two different reference blocks), and parameters of linear combination comprising the normalized weights $\{w_{Ni}\}$ and offset value $(O_0 \times \hat{w}_0 + O_1 \times \hat{w}_1) \times 2^{(log_2 WD)-s}$: $p = (p_0 \times w_{N0} + p_1 \times w_{N1} + (O_0 \times \hat{w}_0 + O_1 \times \hat{w}_1) \times 2^{(log_2 WD)-s}) >> log_2 WD$ In another embodiment, in step 3, the offset value may be added after a linear combination. In an example: $p = ((p_0 \times w_{N0} + p_1 \times w_{N1}) >> log_2 WD) + O_{bi}$ This post-weighting offset $O_{bi}$ is defined as $$\frac{(O_0 \times \hat{w}_0 + O_1 \times \hat{w}_1)}{2^s}.$$

This offset value may be obtained using right-shift operation, e.g. as follows: $O_{bi} = (O_0 \times \hat{w}_0 + O_1 \times \hat{w}_1) >> s$, or as follows: $O_{bi} = (O_0 \times \hat{w}_0 + O_1 \times \hat{w}_1 + (1 << (s-1))) >> s$.

The value of s for bitdepth for position-dependent weight could be equal, e.g. to 3. In this case, offset value may be obtained, e.g. as follows: $O_{bi} = (O_0 \times \hat{w}_0 + O_1 \times \hat{w}_1) >> 3$, or as follows: $O_{bi} = (O_0 \times \hat{w}_0 + O_1 \times \hat{w}_1 + 4) >> 3$.

The value of s for bitdepth for position-dependent weight could be equal, e.g. to 4. In this case, offset value may be obtained, e.g. as follows: $O_{bi} = (O_0 \times \hat{w}_0 + O_1 \times \hat{w}_1) >> 4$, or as follows: $O_{bi} = (O_0 \times \hat{w}_0 + O_1 \times \hat{w}_1 + 8) >> 4$.

The value of s for bitdepth for position-dependent weight could be equal, e.g. to 2. In this case, offset value may be obtained, e.g. as follows: $O_{bi} = (O_0 \times \hat{w}_0 + O_1 \times \hat{w}_1) >> 4$, or as follows: $O_{bi} = (O_0 \times \hat{w}_0 + O_1 \times \hat{w}_1 + 2) >> 2$.

Additionally, the value of s could be signaled in the bitstream at picture level (e.g., picture header or AUD), slice level (e.g. slice header) or in PPS or SPS, or it may have a hierarchical syntax wherein signaling on different levels is combined.

According to one embodiment, the specification draft of VVC may be defined as follows:

Inputs to this process may be: two variables nCbW and nCbH specifying the width and the height of the current coding block, two (nCbW)×(nCbH) arrays predSamplesLA and predSamplesLB, a variable triangleDir specifying the partition direction, a variable cIdx specifying colour component index. Output of this process is the (nCbW)×(nCbH) array pbSamples of prediction sample values.

The variable nCbR is derived as follows:

$$nCbR = (nCbW > nCbH) ? (nCbW / nCbH) : (nCbH / nCbW)$$

The variable bitDepth is derived as follows:

If cIdx is equal to 0, bitDepth is set equal to BitDepthY.

Otherwise, bitDepth is set equal to BitDepthC.

Variables shift1 and offset1 are derived as follows:

The variable shift1 is set equal to Max(5, 17−bitDepth).

The variable offset1 is set equal to 1<<(shift1−1).

Depending on the values of triangleDir and cIdx, the prediction samples pbSamples[x][y] with x=0 . . . nCbW−1 and y=0 . . . nCbH−1 are derived as follows:

The variable wIdx is derived as follows:

If cIdx is equal to 0 and triangleDir is equal to 0, the following applies:

$$wIdx = (nCbW > nCbH)?(Clip3(0, 8, (x/nCbR - y) + 4)):$$
$$(Clip3(0, 8, (x - y/nCbR) + 4))$$

Otherwise, if cIdx is equal to 0 and triangleDir is equal to 1, the following applies:

$$wIdx = (nCbW > nCbH)?(Clip3(0, 8, (nCbH - 1 - x/nCbR - y) + 4))$$
$$(Clip3(0, 8, (nCbW - 1 - x - y/nCbR) + 4))$$

Otherwise, if cIdx is greater than 0 and triangleDir is equal to 0, the following applies:

$$wIdx = (nCbW > nCbH)?(Clip3(0, 4, (x/nCbR - y) + 2)):$$
$$(Clip3(0, 4, (x - y/nCbR) + 2))$$

Otherwise (if cIdx is greater than 0 and triangleDir is equal to 1), the following applies:

$$wIdx = (nCbW > nCbH)?(Clip3(0, 4, (nCbH - 1 - x/nCbR - y) + 2))$$
$$(Clip3(0, 4, (nCbW - 1 - x - y/nCbR) + 2))$$

The variable wValue specifying the weight of the prediction sample is derived using wIdx and cIdx as follows:

$$wValue = (cIdx == 0)?Clip3(0, 8, wIdx): Clip3(0, 8, wIdx*2)$$

The value w0 is defined as follows

If cIdx is equal to 0 for luma samples, the following applies:

$$log2Wd = luma\_log2\_weight\_denom + shift1$$

$$w0 =$$
$$(triangleDir == 0)?LumaWeightL0[refIdxL0]: LumaWeightL1[refIdxL1]$$
$$w1 = (triangleDir == 0)?LumaWeightL1[refIdxL1]:$$
$$LumaWeightL0[refIdxL0]$$
$$o0 = ((triangleDir == 0)?luma\_offset\_l0[refIdxL0]:$$
$$luma\_offset\_l1[refIdxL1] \ll (BitDepthY - 8)$$
$$o1 = ((triangleDir == 0)?luma\_offset\_l1[refIdxL1]:$$
$$luma\_offset\_l0[refIdxL0] \ll (BitDepthY - 8)$$

Otherwise (cIdx is not equal to 0 for chroma samples), the following applies:

$$log2Wd = ChromaLog2WeightDenom + shift1$$

$$cIdxM1 = cIdx - 1$$

$$w0 = (triangleDir == 0)?ChromaWeightL0[refIdxL0][cIdxM1]:$$
$$ChromaWeightL1[refIdxL1][cIdxM1]$$
$$w1 = (triangleDir == 0)?ChromaWeightL1[refIdxL1][cIdxM1]:$$
$$ChromaWeightL0[refIdxL0][cIdxM1]$$
$$o0 = ((triangleDir == 0)?ChromaOffsetL0[refIdxL0]:$$
$$ChromaOffsetL1[refIdxL1])o1 =$$
$$((triangleDir == 0)?ChromaOffsetL1[refIdxL1]:$$
$$ChromaOffsetL0[refIdxL0])$$
$$o0 = o0 \ll (BitDdepthC - 8)$$
$$o0 = o1 \ll (BitDdepthC - 8)$$

The offset value is derived as follows:

$$offsetBi = ((triangleDir == 0)?o1:o0)*wValue +$$
$$((triangleDir == 0)?o0:o1)*(8 - wValue))$$
$$offsetBi = offsetBi \gg 1$$

The joint weight wBi0 is derived as follows:

$$wBi0 = ((triangleDir == 0)?w1:w0)*wValue) \gg 3$$
$$wBi1 = ((triangleDir == 0)?w0:w1)*(8 - wValue)) \gg 3$$

The prediction sample values are derived as follows:

$$pbSamples[x][y] = Clip3(0, (1 \ll bitDepth) - 1,$$
$$((predSamplesL0[x][y]*wBi0 + predSamplesL1[x][y]*wBi1 \gg$$
$$(log2Wd + 1)) + offsetBi)$$

Alternatively, the last two steps (i.e. deriving the offset value and deriving the joint weight wBi0 as referred to above) could be defined in the same way as in "Explicit weighted sample prediction process" section of the VVC specification draft:

The offset value may be derived as follows:

$$offsetBi = (((triangleDir = 0)?o1:o0)*wValue +$$
$$((triangleDir == 0)?o0:o1)*(8 - wValue))$$

The joint weight wBi0 is derived as follows:

$$wBi0 = (((triangleDir == 0)?w1:w0)*wValue) + 4) \gg 3$$

$$wBi1 = (((triangleDir == 0)?w0:w1)*(8 - wValue)) + 4) \gg 3$$

The prediction sample values are derived as follows:

$$pbSamples[x][y] = Clip3(0, (1 \ll bitDepth) - 1,$$

$$((predSamplesL0[x][y]*wBi0 + predSamplesL1[x][y]*wBi1) \gg$$

$$(offsetBi + 1) \ll log2Wd)) \gg (log2Wd + 1))$$

Following is an explanation of the applications of the encoding method as well as the decoding method as shown in the above-mentioned embodiments, and a system using them, according to some embodiments.

Figure 11:
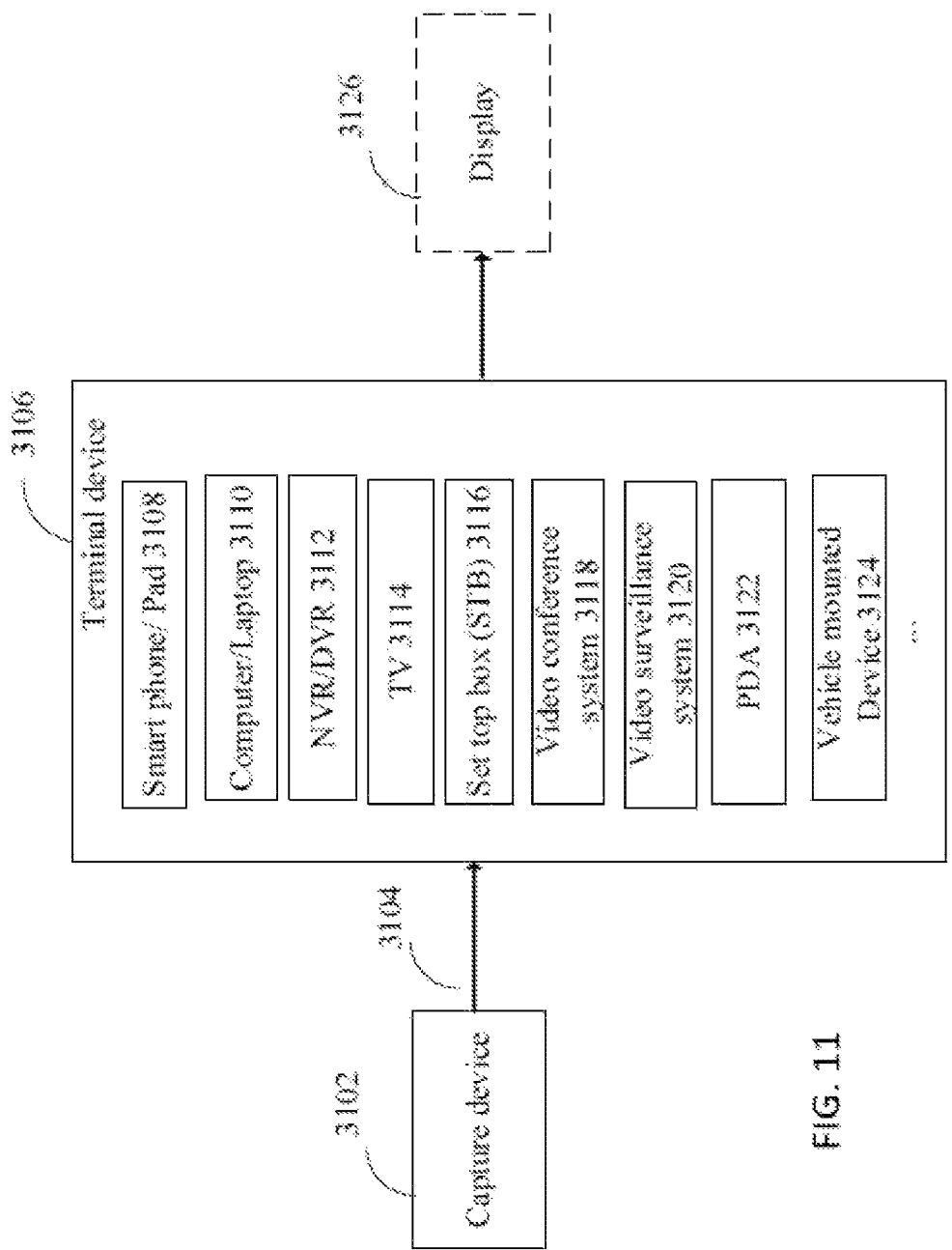
FIG. 11 is a block diagram showing an example structure of a content supply system 3100 which realizes a content delivery service.

FIG. 11 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, television (TV) 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 12:
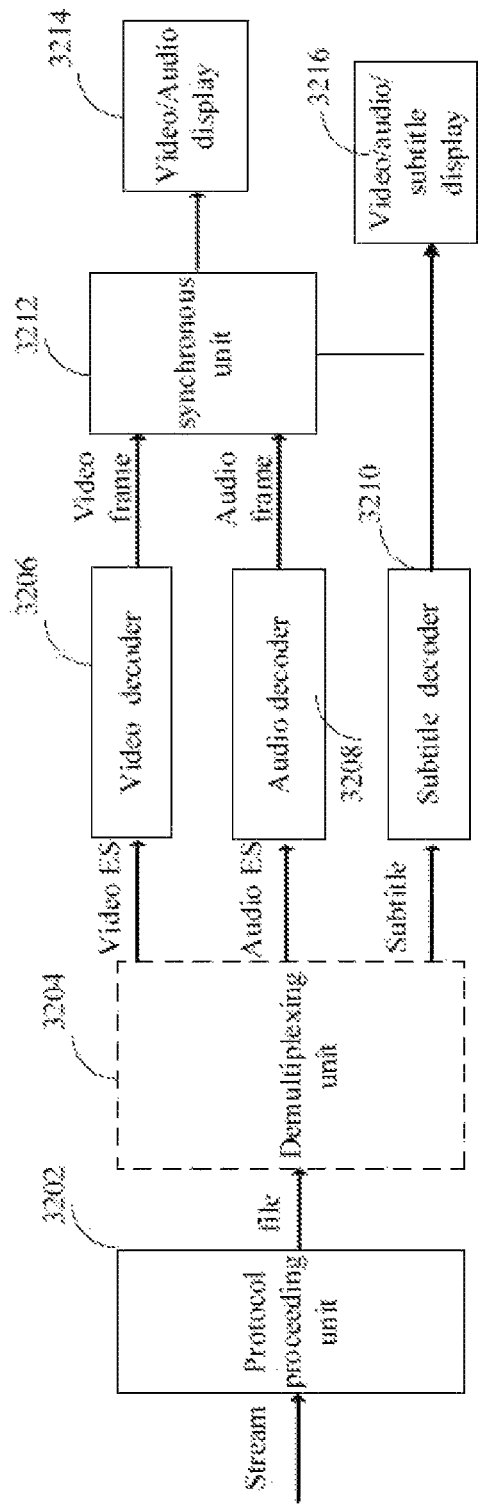
FIG. 12 is a block diagram showing a structure of an example of a terminal device.

FIG. 12 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 12) before feeding it to the synchronous unit 3212. Similarly, the audio frame may store in a buffer (not shown in FIG. 12) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself If subtitle is included in the stream, the subtitle decoder 3210 decodes the subtitle, and synchronizes it with the video frame and the audio frame, and supplies the video/audio/subtitle to a video/audio/subtitle display 3216.

The present disclosure is not limited to the above-mentioned system, and either the picture encoding device or the picture decoding device in the above-mentioned embodiments can be incorporated into other system, for example, a car system.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:

| | |
|---|---|
| + | Addition |
| − | Subtraction (as a two-argument operator) or negation (as a unary prefix operator) |
| * | Multiplication, including matrix multiplication |
| $x^y$ | Exponentiation. Specifies x to the power of y. In other contexts, such notation is used for superscripting not intended for interpretation as exponentiation. |
| / | Integer division with truncation of the result toward zero. For example, 7/4 and −7/−4 are truncated to 1 and −7/4 and 7/−4 are truncated to −1. |
| ÷ | Used to denote division in mathematical equations where no truncation or rounding is intended. |
| $\dfrac{x}{y}$ | Used to denote division in mathematical equations where no truncation or rounding is intended. |
| $\sum_{i=x}^{y} f(i)$ | The summation of f( i ) with i taking all integer values from x up to and including y. |
| x % y | Modulus. Remainder of x divided by y, defined only for integers x and y with x >= 0 and y > 0. |

Logical Operators

The following logical operators are defined as follows:

| | |
|---|---|
| x && y | Boolean logical "and" of x and y |
| x \|\| y | Boolean logical "or" of x and y |
| ! | Boolean logical "not" |
| x ? y : z | If x is TRUE or not equal to 0, evaluates to the value of y; otherwise, evaluates to the value of z. |

Relational Operators

The following relational operators are defined as follows:

| | |
|---|---|
| > | Greater than |
| >= | Greater than or equal to |
| < | Less than |
| <= | Less than or equal to |
| = = | Equal to |
| != | Not equal to |

When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:

| | |
|---|---|
| & | Bit-wise "and". When operating on integer arguments, operates on a two's complement representation of the integer value. When operating on a binary argument that contains fewer bits than another argument, the shorter argument is extended by adding more significant bits equal to 0. |
| \| | Bit-wise "or". When operating on integer arguments, operates on a two's complement representation of the integer value. When operating on a binary argument that contains fewer bits than another argument, the shorter argument is extended by adding more significant bits equal to 0. |
| ^ | Bit-wise "exclusive or". When operating on integer arguments, operates on a two's complement representation of the integer value. When operating on a binary argument that contains fewer bits than another argument, the shorter argument is extended by adding more significant bits equal to 0. |
| x >> y | Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation. |
| x << y | Arithmetic left shift of a two's complement integer representation of x by y binary digits. This function is defined only for non-negative integer values of y. Bits shifted into the least significant bits (LSBs) as a result of the left shift have a value equal to 0. |

Assignment Operators
The following arithmetic operators are defined as follows:

| | |
|---|---|
| = | Assignment operator |
| ++ | Increment, i.e., x++ is equivalent to x = x + 1; when used in an array index, evaluates to the value of the variable prior to the increment operation. |
| −− | Decrement, i.e., x−− is equivalent to x = x − 1; when used in an array index, evaluates to the value of the variable prior to the decrement operation. |
| += | Increment by amount specified, i.e., x += 3 is equivalent to x = x + 3, and x += (−3) is equivalent to x = x + (−3). |
| −= | Decrement by amount specified, i.e., x −= 3 is equivalent to x = x − 3, and x −= (−3) is equivalent to x = x − (−3). |

Range Notation
The following notation is used to specify a range of values:

x = y..z x takes on integer values starting from y to z, inclusive, with x, y, and z being integer numbers and z being greater than y.

Mathematical Functions
The following mathematical functions are defined:

"x + y", "x − y" (as a two-argument operator), "$\sum_{i=x}^{y} f(i)$"

Asin( x ) the trigonometric inverse sine function, operating on an argument x that is in the range of −1.0 to 1.0, inclusive, with an output value in the range of $-\pi \div 2$ to $\pi \div 2$, inclusive, in units of radians Atan( x ) the trigonometric inverse tangent function, operating on an argument x, with an output value in the range of $-\pi \div 2$ to $\pi \div 2$, inclusive, in units of radians $$\text{Atan2}(y, x) = \begin{cases} \text{Atan}\left(\frac{y}{x}\right); & x > 0 \\ \text{Atan}\left(\frac{y}{x}\right) + \pi; & x < 0 \;\&\&\; y >= 0 \\ \text{Atan}\left(\frac{y}{x}\right) - \pi; & x < 0 \;\&\&\; y < 0 \\ +\frac{\pi}{2}; & x == 0 \;\&\&\; y >= 0 \\ -\frac{\pi}{2}; & \text{otherwise} \end{cases}$$

Ceil( x ) the smallest integer greater than or equal to x.
Clip1Y( x ) = Clip3( 0, ( 1 << BitDepthY ) − 1, x )
Clip1C( x ) = Clip3( 0, ( 1 << BitDepthC ) − 1, x )

$$\text{Clip3}(x, y, z) = \begin{cases} x; & z < x \\ y; & z > y \\ z; & \text{otherwise} \end{cases}$$

Cos( x ) the trigonometric cosine function operating on an argument x in units of radians.
Floor( x ) the largest integer less than or equal to x.

$$\text{GetCurrMsb}(a, b, c, d) = \begin{cases} c + d; & b - a >= d/2 \\ c - d; & a - b > d/2 \\ c; & \text{otherwise} \end{cases}$$

Ln( x ) the natural logarithm of x (the base-e logarithm, where e is the natural logarithm base constant 2.718 281 828 . . . ).
Log2( x ) the base-2 logarithm of x.
Log10( x ) the base-10 logarithm of x.

$$\text{Min}(x, y) = \begin{cases} x; & x <= y \\ y; & x > y \end{cases}$$

$$\text{Max}(x, y) = \begin{cases} x; & x >= y \\ y; & x < y \end{cases}$$

Round( x ) = Sign( x ) * Floor( Abs( x ) + 0.5 )

$$\text{Sign}(x) = \begin{cases} 1; & x > 0 \\ 0; & x == 0 \\ -1; & x < 0 \end{cases}$$

Sin( x ) the trigonometric sine function operating on an argument x in units of radians
Sqrt( x ) = $\sqrt{x}$
Swap( x, y ) = ( y, x )
Tan( x ) the trigonometric tangent function operating on an argument x in units of radians Order of Operation Precedence
When an order of precedence in an expression is not indicated explicitly by use of parentheses, the following rules apply:

− Operations of a higher precedence are evaluated before any operation of a lower precedence.
− Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

Operation precedence from highest (at top of table) to lowest (at bottom of table)

operations (with operands x, y, and z)

"x++", "x− −"
"!x", "x−" (as a unary prefix operator)
$x^y$
"x*y", "x/y", "x÷y", "$\frac{x}{y}$", "x % y"
"x + y", "x − y" (as a two-argument operator), "$\sum_{i=x}^{y} f(i)$"
"x << y", "x >> y"
"x < y", "x <= y", "x > y", "x >= y"
"x = = y", "x != y"
"x & y"
"x | y"
"x && y"
"x || y"
"x ? y : z"
"x..y"
"x = y", "x += y", "x −= y"

Text Description of Logical Operations

In the text, a statement of logical operations as would be described mathematically in the following form.

if(condition 0)
  statement 0
  else if(condition 1)
  statement 1
  . . .
  else/*informative remark on remaining condition*/
  statement n may be described in the following manner.
  . . . as follows/ . . . the following applies.
  If condition 0, statement 0
  Otherwise, if condition 1, statement 1
  . . .
  Otherwise (informative remark on remaining condition), statement n.

Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . " statements can be identified by matching " . . . as follows" or " . . . the following applies" with the ending "Otherwise, . . . ".

In the text, a statement of logical operations as would be described mathematically in the following form.

if(condition 0a && condition 0b)
  statement 0
  else if(condition 1a||condition 1b)
  statement 1
  . . .
  else
  statement n may be described in the following manner.

. . . as follows/ . . . the following applies:
  If all of the following conditions are true, statement 0:
  condition 0a
  condition 0b
  . . .
  Otherwise, if one or more of the following conditions are true, statement 1:
  condition 1a
  condition 1b
  . . .
  Otherwise, statement n In the text, a statement of logical operations as would be described mathematically in the following form.

if (condition 0)
  statement 0
  if (condition 1)
  statement 1 may be described in the following manner.
  When condition 0, statement 0
  When condition 1, statement 1.

Though the description above makes use of the programming language C or provides programming code in C-language, this is, in at least some embodiments, not binding to the disclosure. Indeed, in some embodiments, the disclosure may be implemented using other programming language and/or other programming tools and/or other software modules than the ones described above and below.

In this sense, the use of C-language or C program code may, in some embodiments, be rather considered as pseudo-code, reflecting what, according to embodiments of the disclosure, happens, but not restricting the disclosure to the application of a specific programming code. Rather, embodiments may make use of the actual functions described above, independent from any specific implementation in program code and/or use of a specific programming language.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Figure 13:
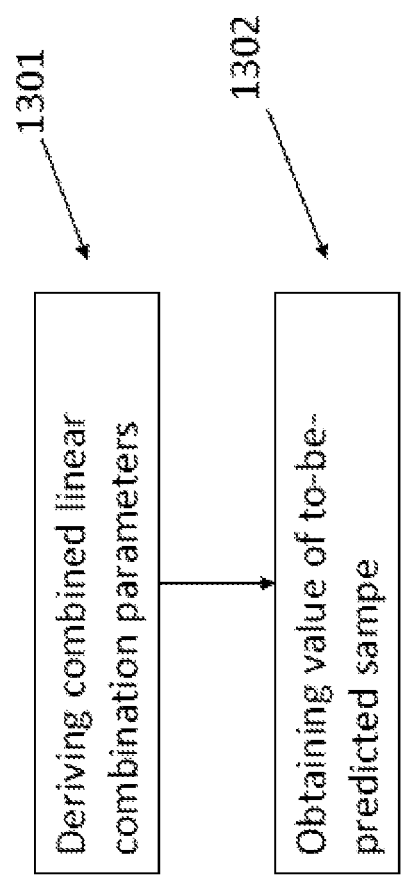
FIG. 13 shows a flow diagram of a method according to an embodiment of the disclosure.

FIG. 13 shows a flow diagram of a method of an inter prediction process. The method may be performed by one of the entities described above and below. In an example, the method may be implemented by an encoder and/or a decoder, as explained in FIGS. 14 and 15.

According to the embodiment shown in FIG. 13, the method comprises the following steps. It is noted that the order of the steps is not exclusive and the order may be rearranged or (sub-)steps may be performed in between the steps explained in FIG. 13.

The method of FIG. 13 begins with the steps of deriving 1301 combined linear combination parameters from two sets of linear combination parameters, wherein the two sets of linear combination parameters comprises: a first set of linear combination parameters, the first set comprising at least one parameter, wherein the values of the linear combination parameters of the first set are independent from the position of a to-be-predicted sample within a to-be-predicted block, and a second set of linear combination parameters, the second set comprising at least one parameter, wherein the values of the linear combination parameters of the second set depend on the position of the to-be-predicted sample within the to-be-predicted block.

The method then proceeds with obtaining 1302 the value(s) of the to-be-predicted sample using the combined linear combination parameters and predicted values of at least two samples belonging to different reference blocks of the to-be-predicted block.

The method of FIG. 13 may be part of an encoding process or a decoding process.

Figure 14:
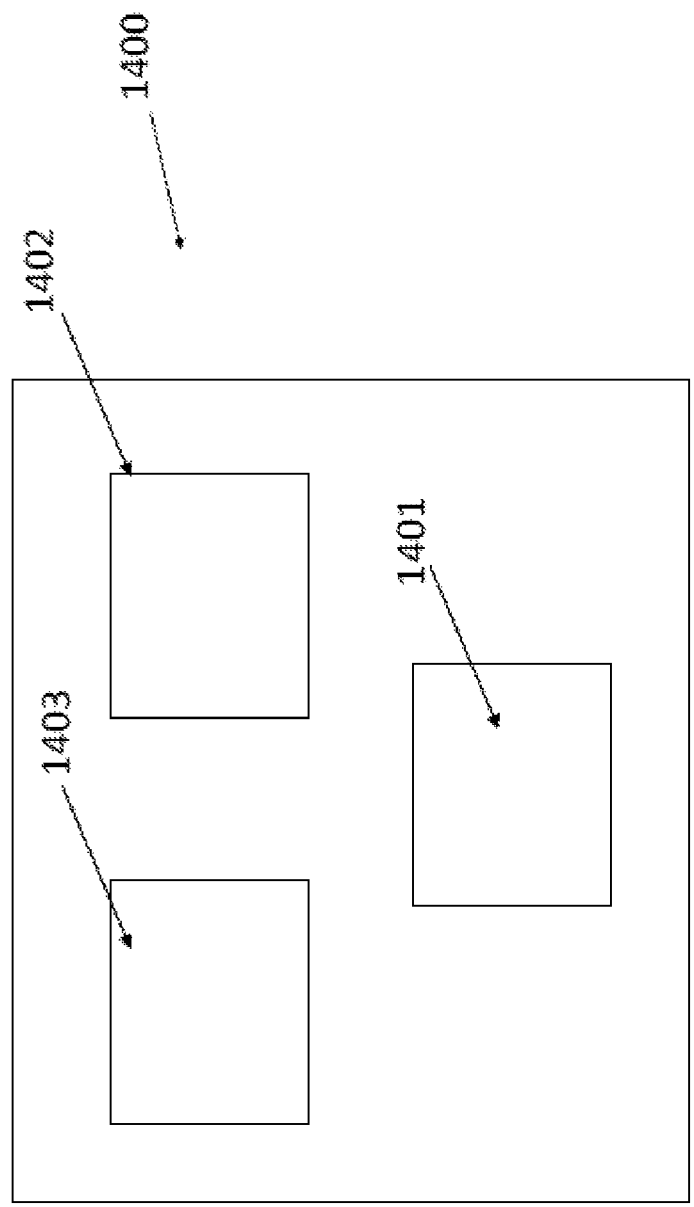
FIG. 14 is a schematic diagram of an encoder according to one embodiment.
Figure 15:
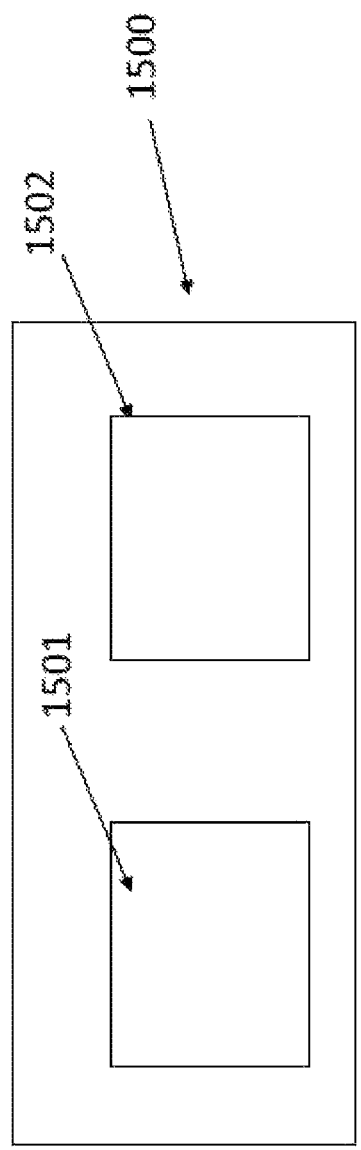
FIG. 15 is a schematic diagram of a decoder according to one embodiment.

Correspondingly, FIGS. 14 and 15 show an encoder and a decoder that may implement the method according to the embodiments described above and according to the embodiment of FIG. 13.

The FIGS. 14 and 15 show further exemplary embodiments of hardware, an example of an encoder (FIG. 14) and a decoder (FIG. 15) that are adapted to implement embodiments of the disclosure.

In FIG. 14, the encoder 1400 for encoding a video sequence using a method of an inter prediction process (for example the one described in relation to FIG. 13) comprises a deriving unit 1401, a predicting unit 1402 and an encoding unit 1403.

In this embodiment, the deriving unit 1401 is adapted for deriving combined linear combination parameters from two sets of linear combination parameters, wherein the two sets of linear combination parameters comprises: a first set of linear combination parameters, the first set comprising at least one parameter, wherein the values of the linear combination parameters of the first set are independent from the position of a to-be-predicted sample within a to-be-predicted block, and a second set of linear combination parameters, the second set comprising at least one parameter, wherein the values of the linear combination parameters of the second set depend on the position of the to-be-predicted sample within the to-be-predicted block.

The predicting unit 1402 is adapted for obtaining the value of the to-be-predicted sample using the combined linear combination parameters and predicted values of at least two samples belonging to different reference blocks of the to-be-predicted block.

The encoding unit 1403 is adapted for encoding the video sequence. This may comprise, in one embodiment, using the different reference blocks and the first set of linear combination parameters and the second set of linear combination parameters and the predicted values of the at least two samples.

In FIG. 15, the decoder 1500 for decoding an encoded video sequence using a method of an inter prediction process (for example a method according to claim 13) comprises a receiving unit 1501 and a decoding unit 1502.

The receiving unit 1501 is adapted to receive the encoded video sequence, the encoded video sequence comprising at least two different reference blocks, two samples belonging the different reference blocks, a first set of linear combination parameters, the first set comprising at least one parameter, wherein the values of the linear combination parameters of the first set are independent from the position of a to-be-predicted sample within a to-be-predicted block, and a second set of linear combination parameters, the second set comprising at least one parameter, wherein the values of the linear combination parameters of the second set depend on the position of the to-be-predicted sample within the to-be-predicted block.

The decoding unit 1502 is adapted to decode the video sequence. The decoding comprises, in one embodiment, obtaining a value of the to-be-predicted sample using combined linear combination parameters obtained from the first set of linear combination parameters and the second set of linear combination parameters and predicted values of the at least two samples belonging to the different reference blocks of the to-be-predicted block.

In the description above, a plurality of entities that are implemented as computing systems or part of computing systems or related systems have been described. For any of these entities, in an example, encoders and decoders, it can be provided that these are implemented using a commonly known computing system, like a smartphone, a personal computer, a laptop or any other suitably technology. The components of the encoders and decoders may be implemented in software and/or hardware, like, for example, a processor, memory (like SSD), a graphics card. The disclosure is, however, not limited to the used hardware and/or software by which, for example, the encoder and decoder according to FIGS. 14 and 15 are implemented. The above explanation is thus considered to only be exemplarily and not limiting.

The invention claimed is:

1. A method for inter prediction implemented by a processor of a coding system, wherein the method comprises:
    deriving combined linear combination parameters from a first set of linear combination parameters and a second set of linear combination parameters, wherein the first set comprises at least one first parameter, wherein values of the first set are independent of a position of a to-be-predicted sample within a to-be-predicted block, wherein the second set comprises at least one second parameter, wherein values of the second set depend upon the position; and
    obtaining a value of the to-be-predicted sample using the combined linear combination parameters and predicted values of at least two samples of different reference blocks of the to-be-predicted block.

2. The method of claim 1, wherein the first set further comprises at least one of weight values, offset values or weight bit depth values.

3. The method of claim 1, wherein the second set further comprises at least one of the weight values, or the weight bit depth values.

4. The method of claim 1, wherein the first set further comprises slice-level weighted prediction parameters.

5. The method of claim 1, wherein the first set further comprises bi-prediction with coding unit (CU)-level weights (BCW) weighting parameters.

6. The method of claim 1, wherein the second set comprise triangular partitioning mode (TPM) weighting parameters.

7. The method of claim 1, wherein the second set comprise geometric motion partitioning (GEO) weighting parameters.

8. The method of claim 1, further comprising fetching the combined linear combination parameter values from a look-up table (LUT).

9. The method of claim 1, wherein the different reference blocks comprise different uni-predicted reference blocks.

10. The method of claim 1, further comprising:
    obtaining the first set of linear combination parameters from a header of a slice comprising one or more blocks; and
    obtaining the second set of linear combination parameters from a look-up table (LUT).

11. The method of claim 10, further comprising:
    grouping together the at least one first parameter and the at least one second parameter; and
    obtaining the combined linear combination parameters based on the grouping.

12. The method of claim 11, further comprising applying, for at least one combined linear combination parameter, a right shift to a value of the combined linear combination parameters.

13. The method of claim 12, wherein obtaining the value of the to-be-predicted sample using the combined linear combination parameters and predicted values of the at least two samples of the different reference blocks comprises:
    obtaining, from the second set of linear combination parameters, non-normalized values of the second set of linear combination parameters;
    applying a right shifting to the value of the combined linear combination parameters;
    obtaining at least one normalized combined linear combination parameter based on applying the right shifting; and
    predicting the value of the to-be-predicted sample as a linear combination of the at least two samples of two corresponding reference blocks of the to-be-predicted block and the at least one normalized combined linear combination parameter and based on applying an offset value, wherein the offset value is added during the linear combination of the at least two samples or after the linear combination of the at least two samples of the two corresponding reference blocks and the at least one normalized combined linear combination parameters.

14. A coding device comprising:
    a memory configured to store one or more computer programs comprising instructions; and
    a processor coupled to the memory and configured to execute the one or more computer programs that when executed by the processor cause the coding device to:
        derive combined linear combination parameters from a first set of linear combination parameters and a second set of linear combination parameters, wherein the first set comprises at least one first parameter, wherein values of the first set are independent of a position of a to-be-predicted sample within a to-be-predicted block, wherein the second set comprises at least one second parameter, and wherein values of the second set depend upon the position of the to-be-predicted sample within the to-be-predicted block; and
        obtain a value of the to-be-predicted sample using the combined linear combination parameters and predicted values of at least two samples of different reference blocks of the to-be-predicted block.

15. The coding device of claim 14, wherein the first set comprises at least one of weight values, offset values or weight bit depth values, and wherein the second set comprises at least one of the weight values or the weight bit depth values.

16. The coding device of claim 14, wherein the first set comprises slice-level weighted prediction parameters or bi-prediction with coding unit (CU)-level weights (BCW) weighting parameters.

17. The coding device of claim 14, wherein the second set of linear combination parameters comprise triangular partitioning mode (TPM) weighting parameters, or geometric motion partitioning (GEO) weighting parameters.

18. The coding device of claim 14, wherein the computer programs that when executed by the processor further cause the coding device to fetch the combined linear combination parameters from a look-up table (LUT).

19. The coding device of claim 14, wherein the computer programs that when executed by the processor further cause the coding device to:
    obtain the first set from a header of a slice comprising one or more blocks; and
    obtain the second set in a look-up table (LUT).

20. A non-transitory computer-readable storage medium comprising computer-executable instructions stored thereon that when executed by a processor of a coding device, cause the coding device to:
- derive combined linear combination parameters from a first set of linear combination parameters and a second set of linear combination parameters, wherein the first set comprises at least one first parameter, wherein values of the first set are independent from a position of a to-be-predicted sample within a to-be-predicted block, wherein the second set comprises at least one second parameter, and wherein values of the second set depend upon the position of the to-be-predicted sample within the to-be-predicted block; and
- obtain a value of the to-be-predicted sample using the combined linear combination parameters and predicted values of at least two samples of different reference blocks of the to-be-predicted block.

* * * * *